(12) United States Patent
Helder et al.

(10) Patent No.: US 8,453,380 B1
(45) Date of Patent: Jun. 4, 2013

(54) HORTICULTURE AND FLORICULTURE MOTIVATING SYSTEM

(75) Inventors: Bryan Helder, Wayland, MI (US); Johan ten Veen, Kwintsheul (NL); Leo Gerardus van Adrichem, Kwintsheul (NL); Arie Pieter Nicolaas Barendregt, Beamsville (CA)

(73) Assignee: Formflex Automation USA, Ltd., Wayland, MI (US)

( * ) Notice: Subject to any disclaimer, the term of this patent is extended or adjusted under 35 U.S.C. 154(b) by 661 days.

(21) Appl. No.: 12/502,031

(22) Filed: Jul. 13, 2009

Related U.S. Application Data

(60) Provisional application No. 61/080,145, filed on Jul. 11, 2008.

(51) Int. Cl.
*A01G 9/00* (2006.01)
*A01G 9/02* (2006.01)
*B65G 17/20* (2006.01)

(52) U.S. Cl.
USPC .............. 47/67; 47/17; 47/18; 198/678.1

(58) Field of Classification Search
USPC ....... 47/17, 66.7, 67, 62 R, 59 R, 18; 452/51, 452/177–184; 414/13; 198/678.1, 680, 686, 198/687, 465.4, 685
See application file for complete search history.

(56) References Cited

U.S. PATENT DOCUMENTS

| | | | | |
|---|---|---|---|---|
| 1,311,493 A * | 7/1919 | Burkhardt, Jr. | | 198/680 |
| 1,793,626 A * | 2/1931 | McCormick | | 47/17 |
| 2,244,677 A * | 6/1941 | Cornell | | 47/17 |
| 2,743,809 A * | 5/1956 | Pearson | | 198/678.1 |
| 2,824,410 A * | 2/1958 | Daw | | 47/1.01 R |
| 3,121,638 A * | 2/1964 | Olson et al. | | 426/265 |
| 4,628,631 A * | 12/1986 | Van Wingerden | | 47/65 |
| 6,125,991 A * | 10/2000 | Veldkamp et al. | | 198/678.1 |
| 6,523,462 B1 * | 2/2003 | Johnson et al. | | 99/443 C |
| 7,219,468 B1 * | 5/2007 | Muxlow | | 47/67 |
| 7,347,321 B1 * | 3/2008 | Sakai | | 198/861.2 |
| 2002/0023823 A1 * | 2/2002 | Hoffmann et al. | | 198/685 |
| 2005/0159093 A1 * | 7/2005 | Kasai | | 452/51 |
| 2006/0162252 A1 * | 7/2006 | Lim | | 47/59 R |
| 2006/0245844 A1 * | 11/2006 | Santicchi | | 414/13 |

* cited by examiner

*Primary Examiner* — Andrea Valenti

(74) *Attorney, Agent, or Firm* — Price Heneveld LLP

(57) ABSTRACT

A horticulture and floriculture device that typically includes a track system, a plurality of hanging basket receiving hooks, and at least one motor assembly is provided. The track system receives and carries a moveable chain system and typically includes a plurality of track segments that have a chain carrying portion and an upper portion. The track segments are interconnected with one another to create a travel path. The moveable chain system includes a series of interconnected chain links having an aperture wherein the chain links include horizontally oriented and vertically oriented chain links. The plurality of hanging basket receiving hooks have a cap portion having a base and a main hook portion between the distal end and the base of the cap portion where the cap portion engages, is at least partially spaced within, and is seated in the chain link's aperture such that the chain is capable of moving within the track and carrying the hook around the track with the main hook portion accessible by a user to hang a hanging basket on the hook.

20 Claims, 21 Drawing Sheets

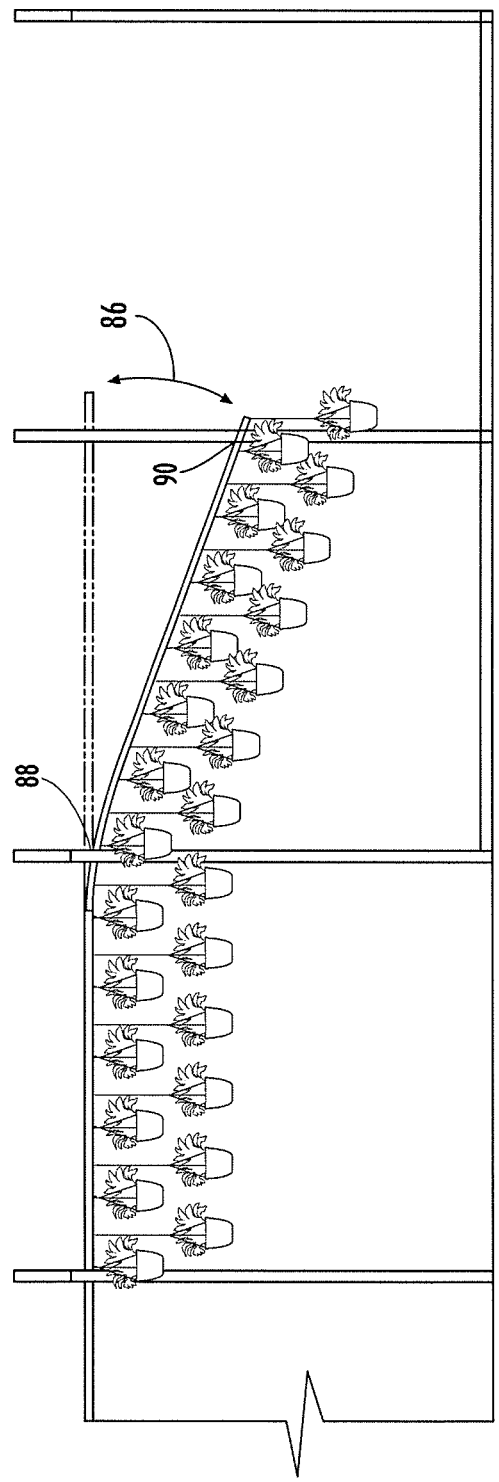

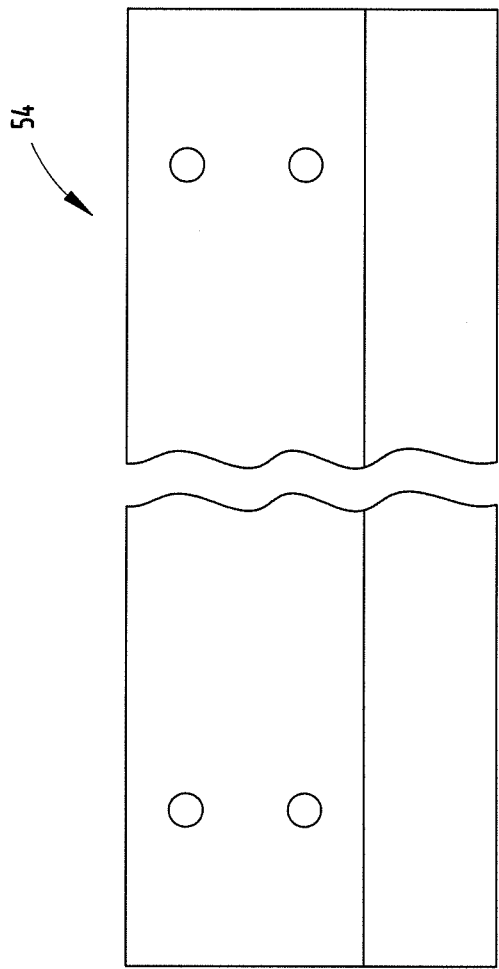
FIG. 6B
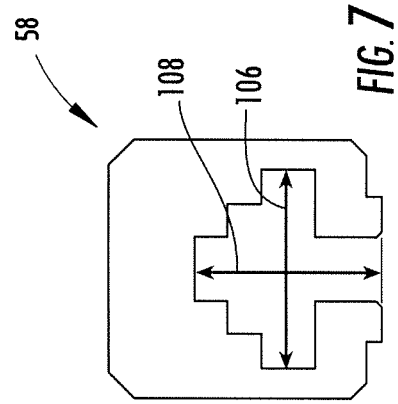
FIG. 7
FIG. 6A

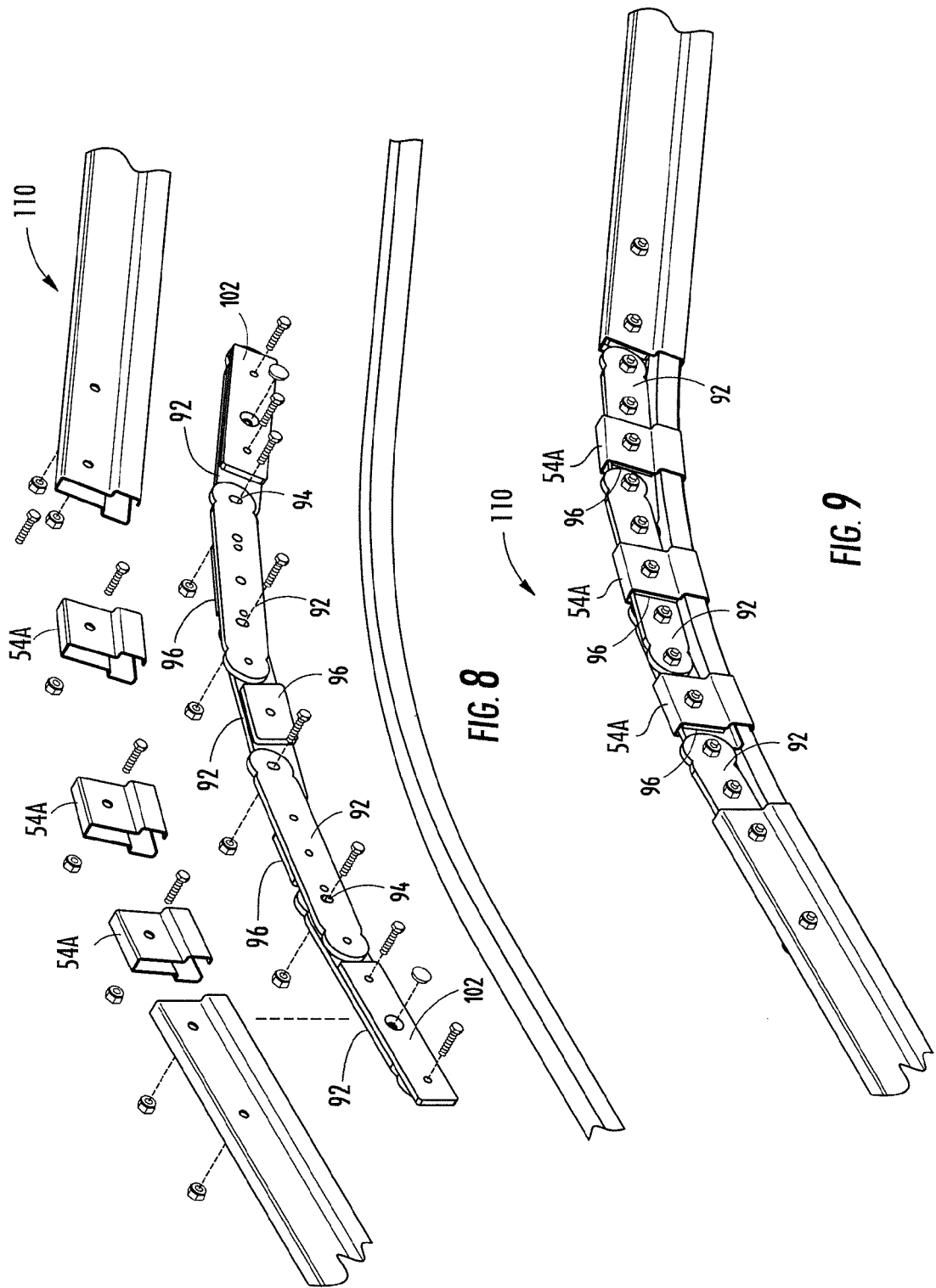

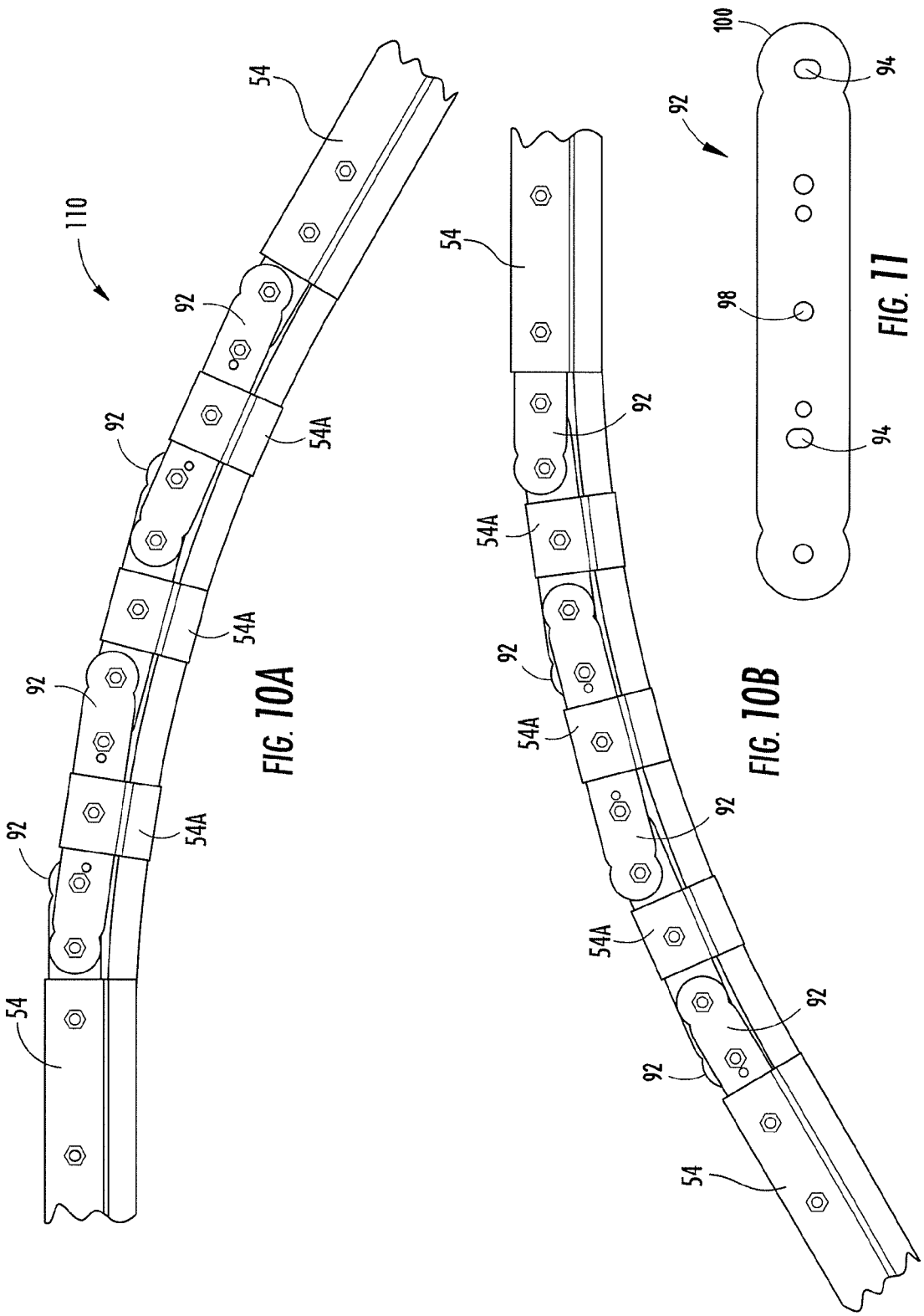

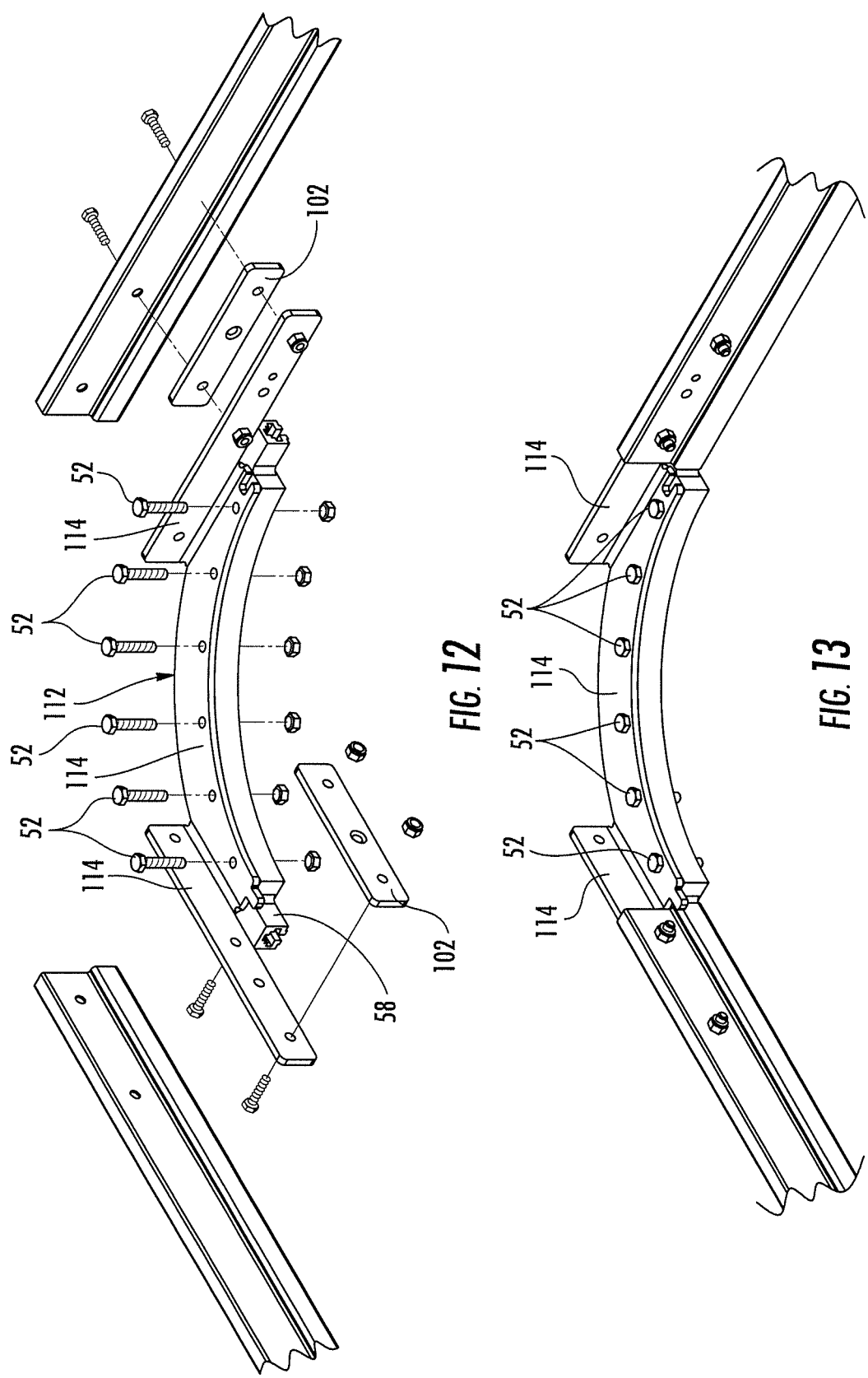

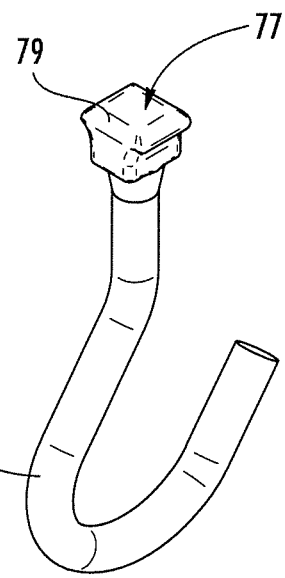
FIG. 22
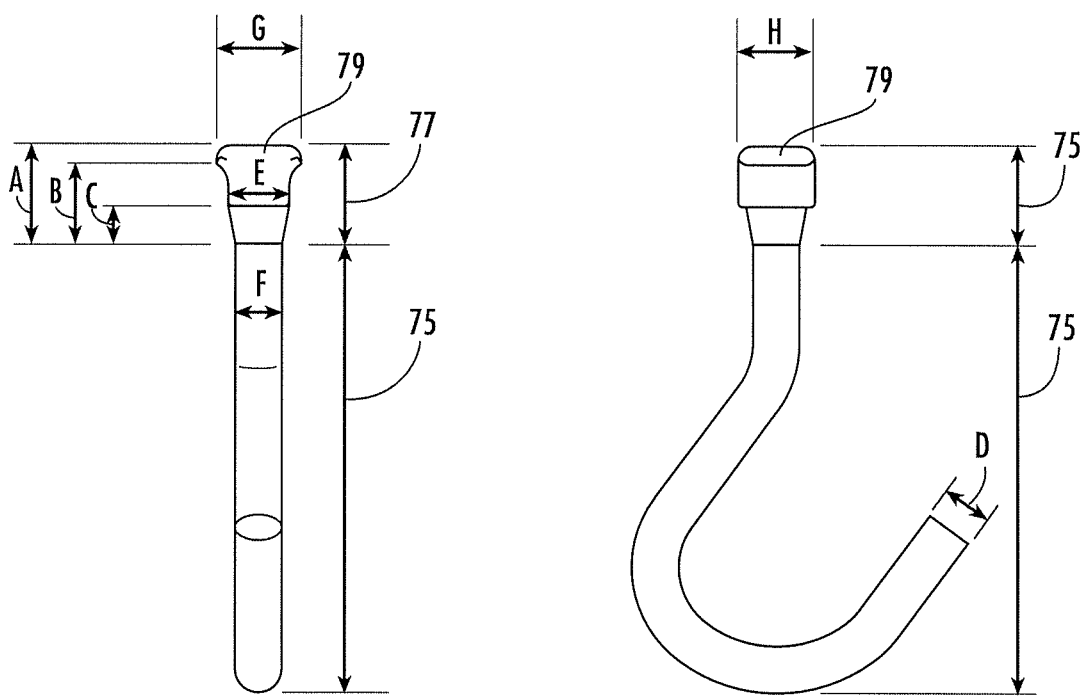
FIG. 23
FIG. 24

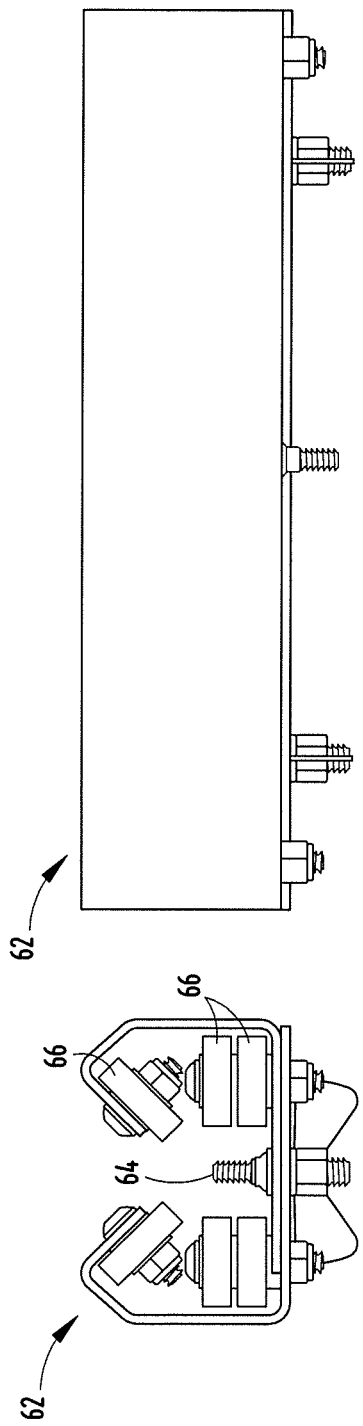

HORTICULTURE AND FLORICULTURE MOTIVATING SYSTEM

CROSS REFERENCE TO RELATED APPLICATION

This application claims priority to and the benefit of U.S. Provisional Application Ser. No. 61/080,145 entitled HORTICULTURE AND FLORICULTURE MOTIVATING SYSTEM, filed on Jul. 11, 2008, the disclosure of which is hereby incorporated by reference in its entirety.

SUMMARY OF THE INVENTION

The present invention generally relates to a horticulture/floriculture motivating and optionally watering device for use typically in a greenhouse or similar plant growing structure capable of extending the growing season of plants as well as the method of its use. The motivating device includes at least one section that may be released via typically a pulley system such that the track declines to a height where a user may easily, typically at floor level, hang plants being grown in hanging baskets. The system further typically includes a motivating assembly and chain and hook system riding within the track. The horticulture/floriculture device/system of an embodiment of the present invention allows for a series of loops as opposed to a single loop motivation system. The total track can be a distance of up to 400 meters, typically the travel distance is less, for example 380 meters or 300 meters with typically three to five complete loops. As discussed above, the present invention typically includes at least one end portion of one of the loops that may decline when a user or users are hanging horticulture or floriculture products such as flower baskets on the hooks riding within the track.

According to an embodiment of the present invention, a horticulture and floriculture device includes a track system and a plurality of hanging basket receiving hooks. The track system receives and carries a moveable chain system and includes a plurality of track segments that have a chain carrying portion and an upper portion. The track segments are interconnected with one another to create a travel path. The moveable chain system includes a series of interconnected unitary chain links having an aperture wherein the chain links include horizontally oriented and vertically oriented unitary chain links. The plurality of hanging basket receiving hooks typically have a distal end opposite a cap portion having a base and a main hook portion between the distal end and the base of the cap portion where the cap portion engages, is at least partially spaced within, and is seated in the chain link's aperture such that the chain is capable of moving within the track and carrying the hook around the track with the main hook portion accessible by a user to hang a hanging basket on the hook.

According to another embodiment of the present invention a horticulture and floriculture device includes a track system that receives and carries a moveable chain system. The track system includes a plurality of track segments that have a chain carrying portion and an upper portion and the track segments are interconnected with one another to create a travel path. The moveable chain system includes a series of interconnected unitary chain links each having an aperture wherein the chain links include horizontally oriented and vertically oriented unitary chain links. The track system is positioned proximate a ceiling in a greenhouse and includes a main track section and a declinable track portion where the declinable track portion includes a series of interconnected elongated brackets positioned on alternate sides of one another with a spacer bracket engaged to the center of the elongated brackets that are not engaged to the main track sections. The declinable track portion is capable of repeatedly moving between a first position that is in substantially the same plane or the same plane as the main track section and a declined position where the declined position is at least about a 20 degree angle from the plane of the main track section.

Yet another embodiment of the present invention includes a method of mounting hanging baskets proximate the ceiling of a greenhouse or the ceiling of another structure for growing plants. The method includes the steps of providing a track system that receives and carries a moveable chain system and includes a plurality of track segments that have a chain carrying portion and an upper portion. The track segments are interconnected with one another to create a travel path. The moveable chain system includes a series of interconnected chain links each having an aperture where the chain links include horizontally oriented and vertically oriented chain links and the track system is positioned proximate a ceiling in a greenhouse or the ceiling of another structure for growing plants. The tracks system also includes a main track section and a declinable track portion. The declinable track portion includes a series of interconnected elongated brackets positioned on alternate sided of one another with a spacer bracket engaged to the center of the elongated brackets that are not engaged to the main track sections. The declinable track portion is capable of repeatedly moving between a first position that is in substantially the same plane or the same plane as the main track section and a declined position wherein the declined position is at least about a 20 degree angle from the plane of the main track section. The method also includes the step of providing a plurality of hanging basket receiving hooks having a distal end opposite a cap portion that has a base and a main hook portion between the distal end and the base of the cap portion. The method also includes the step of providing at least one motor assembly that includes a motor, a gear wheel having a plurality of projections that matingly engage the vertically oriented chain links. The method further includes the steps of using a wench or pulley or other moving system to move the declinable section of the track from the first position to the declined position; installing a hanging basket receiving hook into engagement with a unitary chain link that is horizontally oriented when positioned in the track by placing the distal end of the hook through the aperture of the horizontally oriented, unitary chain link until the cap portion engages and is at least partially spaced within and is seated in the chain link's aperture such that the chain is capable of moving within the track and carrying the hook around the track with the main hook portion capable of receiving a hanging basket on the hook without a user touching the hanging basket receiving hook once the hanging basket receiving hook is installed; installing a hanging basket onto the hanging basket receiving hook; and repositioning the declinable section from the declined position to the first position.

BRIEF DESCRIPTION OF THE DRAWINGS

FIG. 1C is an enlarged view of the portion of the system circled in FIG. 1B;

FIG. 6A is an elevated end view of the outer portion of the track assembly according to an embodiment of the present invention;

FIG. 6B is an elevated side view of the outer portion of the track assembly according to an embodiment of the present invention;

FIG. 7 is a cross section view of an extruded plastic insert/chain carrying portion of the track according to an embodiment of the present invention;

FIG. 8 is an exploded perspective view of the downwardly bending portion of an embodiment of the track of the present invention;

FIG. 9 is a perspective view of a downwardly bending portion of the track assembly according to an embodiment of the present invention;

FIGS. 10A and 10B are opposing side views of the downwardly bending portion of an embodiment of the track of the present invention;

FIG. 11 is an elevated side view of an elongated bracket according to an embodiment of the present invention;

FIG. 12 is an exploded view of a curved end portion of the track according to an embodiment of the present invention;

FIG. 13 is an assembled perspective view of a curved end portion of the track according to an embodiment of the present invention;

FIG. 17 is a perspective view of a curved chain carrying portion of the chain-carrying portion according to an embodiment of the present invention;

FIG. 22 is a perspective view of another removable hook according to an embodiment of the present invention;

FIG. 23 is an elevated end view of the removable hook shown in FIG. 22;

FIG. 24 is an elevated side view of the removable hook shown in FIG. 22;

FIG. 29A is an elevated end view of a chain-pulling device utilized to insert the chain within the chain-carrying portion of the track;

FIG. 29B is an elevated side view of a chain-pulling device utilized to insert the chain within the chain-carrying portion of the track;

FIG. 29C is perspective view of a chain-pulling device utilized to insert the chain within the chain-carrying portion of the track.

DETAILED DESCRIPTION OF THE PREFERRED EMBODIMENT

The horticulture/floriculture device/system according to an embodiment of the present invention preferably includes a track assembly 12, a motivating assembly 14, and a chain and hook system 16. As shown in FIG. 1, the horticulture/floriculture system allows for the motivation of a plurality of hanging horticulture/floriculture products, typically hanging baskets. Additionally, the present invention allows for a plurality of track loops 18 thereby facilitating a larger numbers of hanging baskets. Approximately three to five loops of track may be utilized. When using a single motor assembly, Applicants presently believe that a total travel distance of up to 450 meters and possibly higher may be achieved utilizing the device/system of the present invention. Typically the device has a travel distance of 380 meters, more typically a travel distance of 300 meters of track. For each additional motor assembly employed up to about 150 meters of additional travel distance may be achieved or added weight applied to the system.

Figure 1A:
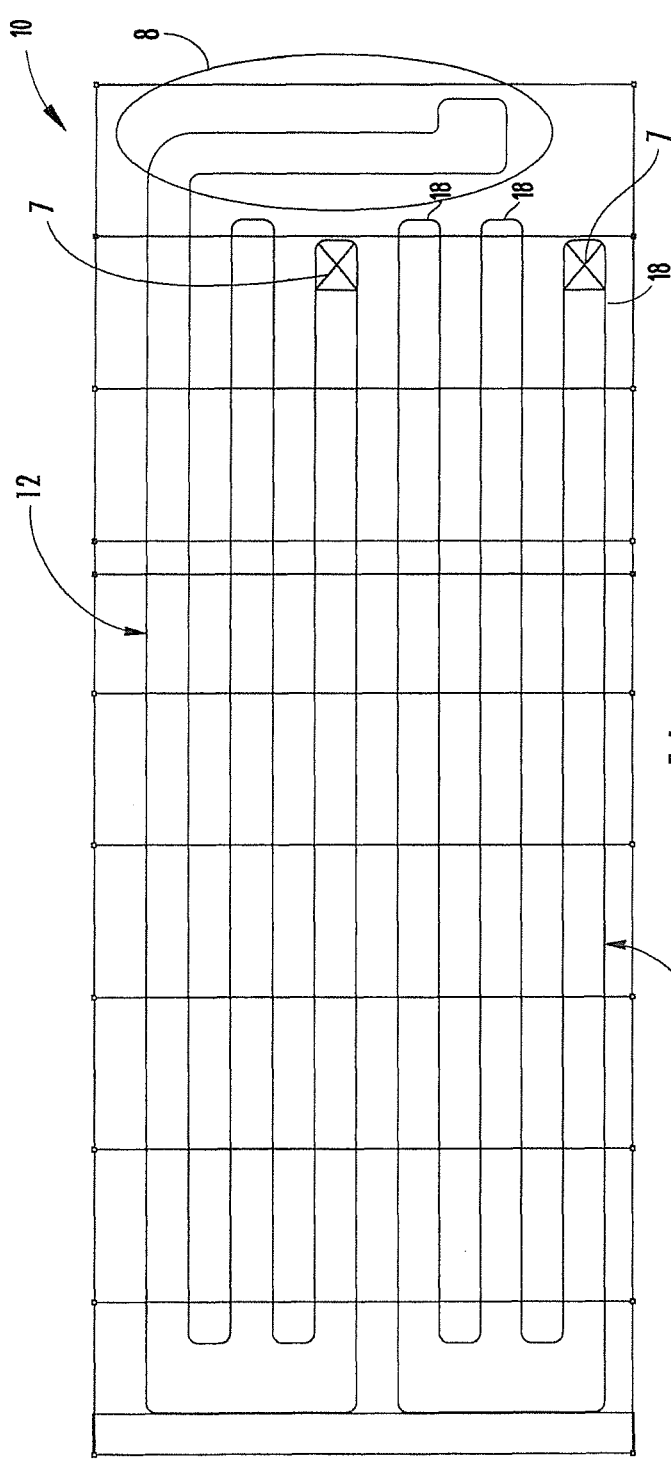
FIGS. 1A and 1B are depictions of a layout of the horticulture/floriculture device/system of the present invention showing two systems installed adjacent to one another.
Figure 1B:
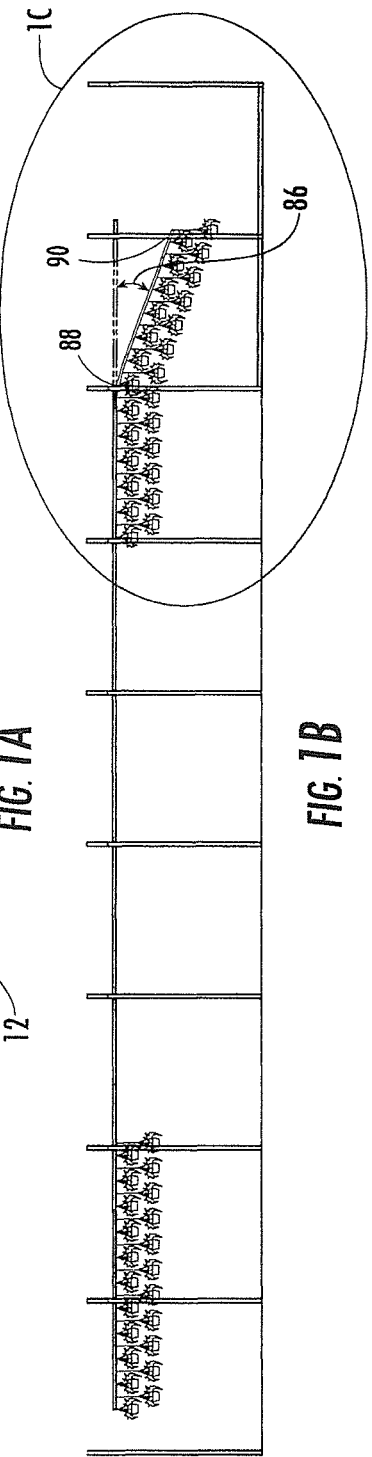

Additionally, the use of the horticulture/floriculture system of the present invention enables greenhouse owners/operators to run track and therefore hang baskets in irregular shapes other than long loops such as L-shaped bends and other configurations to thereby maximize efficiencies of the greenhouse space. This allows for use of previous unused space within the greenhouse/facility. A plurality of irregular (not traditional elongated circular tracks) track assemblies can be utilized. The irregular shaped bends in the track can be any directional change other than the regular, two successive 90-degree turns and may travel different distances. For example, FIG. 1A shows one pattern of the system according to an embodiment of the present invention with substantially 180-degree turns and two locations (one in each system layout) where the system allows for the baskets to move closer to the ground for easy and safe removal or easy and safe installation of the hanging baskets by an average adult person standing on the floor who normally would not be able to hang the hanging baskets from the floor without a ladder or other extending device. The locations where the systems allow for ground level installation and removal of the hanging baskets are shown with an X in FIG. 1A (reference numeral 7) and graphically shown from a side angle view in FIG. 1B. As noted, the second system shown in FIG. 1A (located above the first system) has a section that fills the previously unused portion of the greenhouse by making a series of different (irregular) turns in portion 8 shown in FIG. 1A.

Figure 2A:
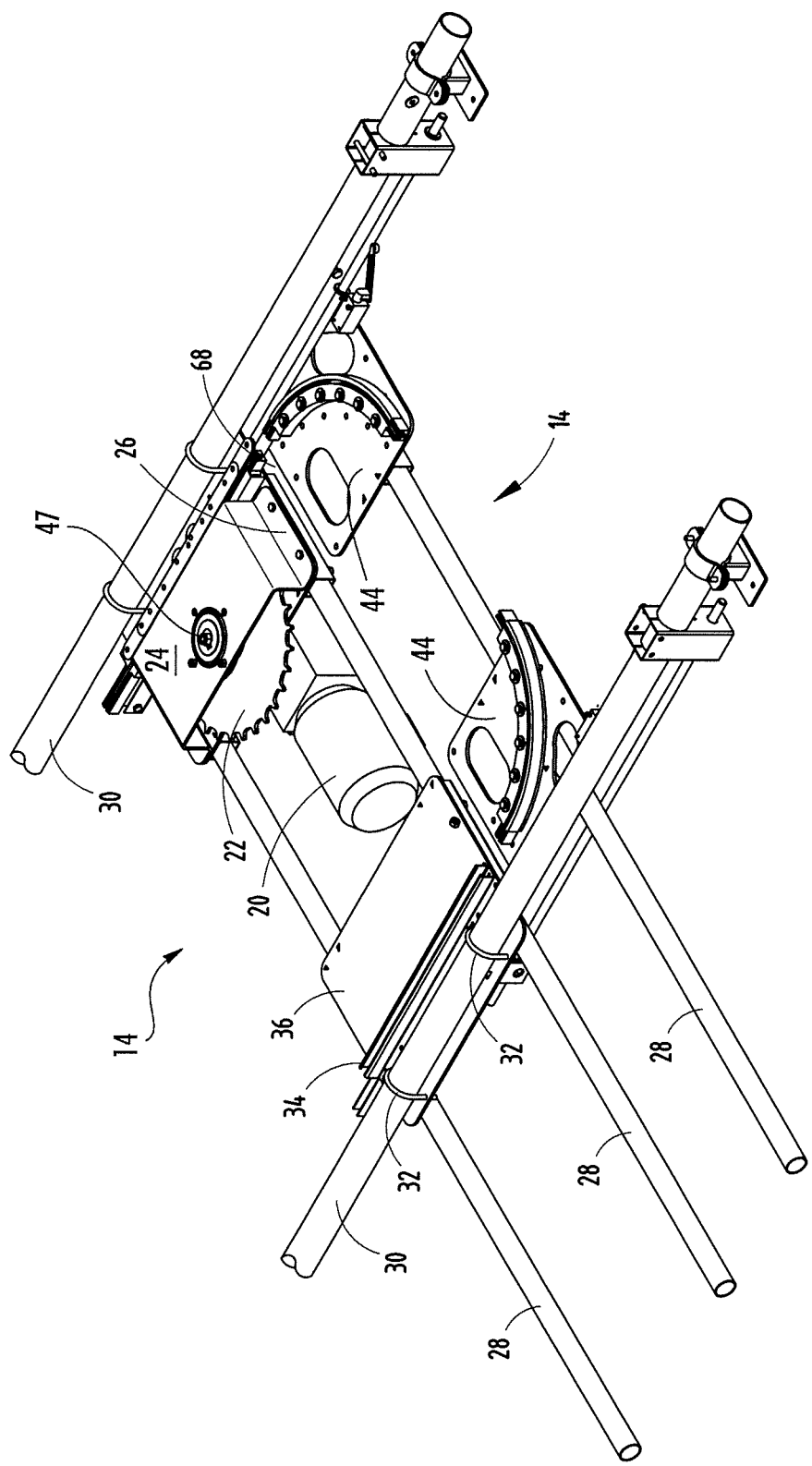
FIG. 2A shows a bottom perspective view of the motivating assembly of an embodiment of the present invention.
Figure 2B:
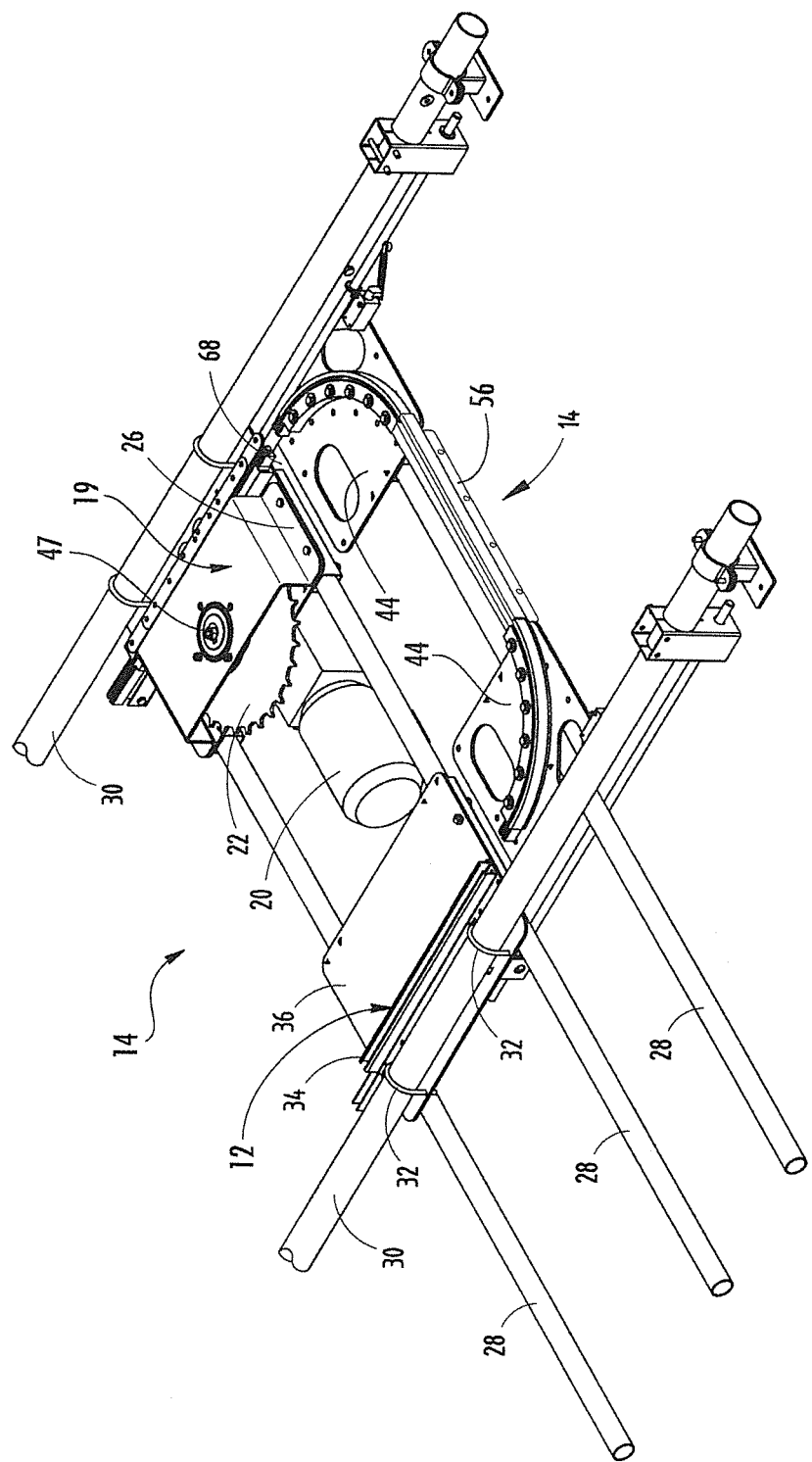
FIG. 2B shows a bottom perspective view of the motivating assembly of an embodiment of the present invention having a track section spaced between the tensioning platforms.
Figure 3:
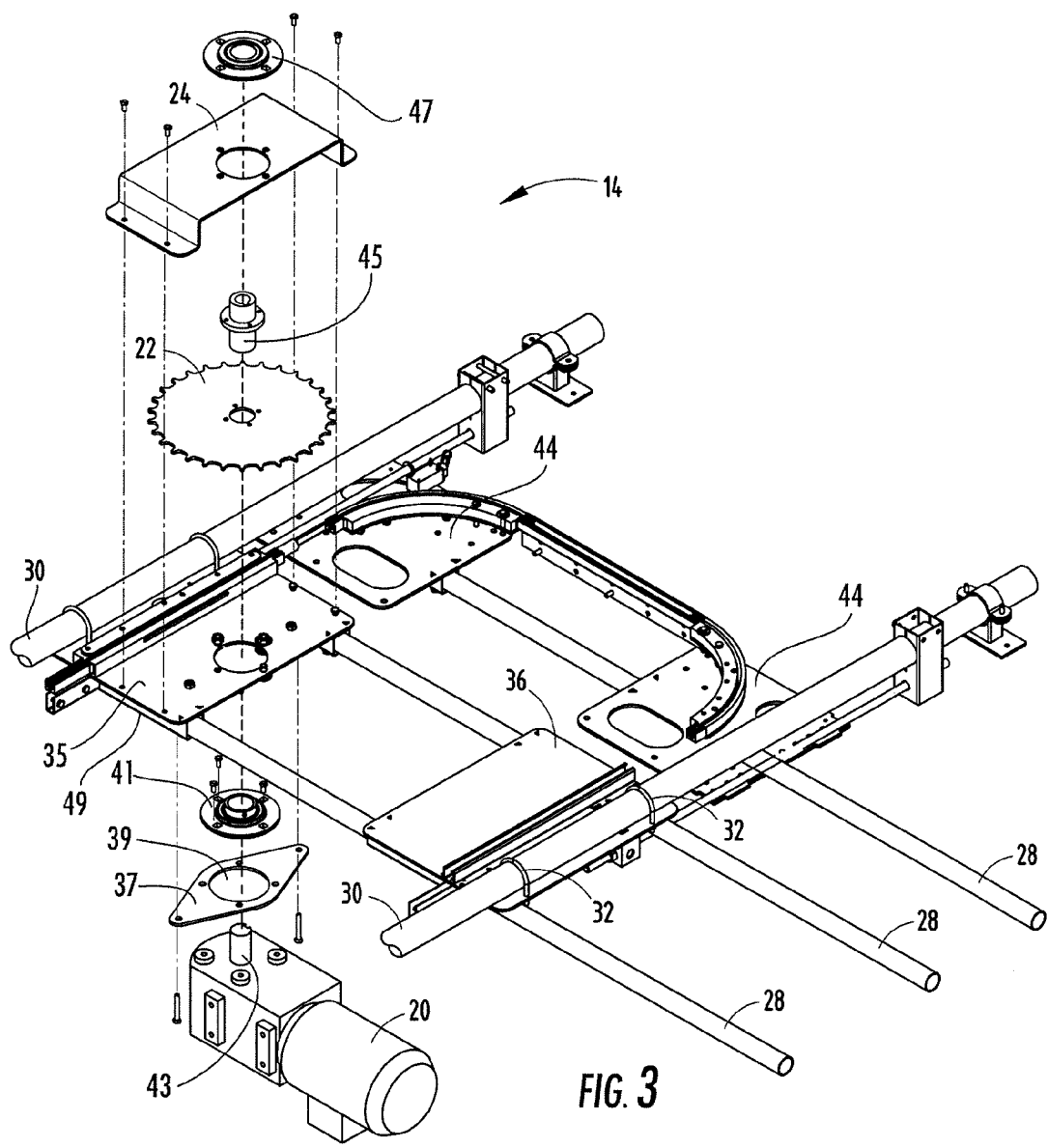
FIG. 3 is a partially exploded, perspective bottom view of a motivating assembly according to the present invention.
Figure 4:
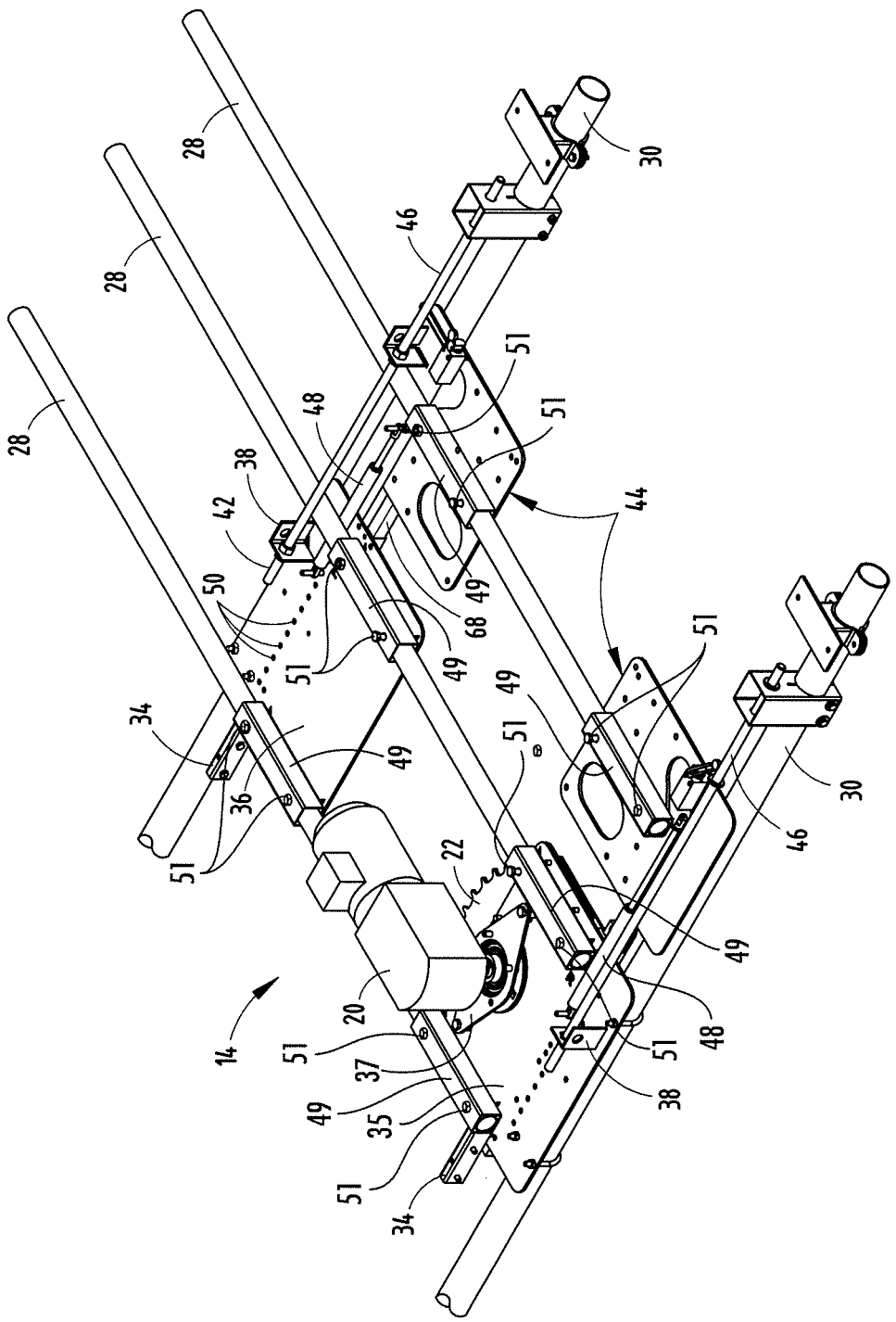
FIG. 4 shows a top perspective view of a motivating sub-assembly according to an embodiment of the present invention.

The motivating assembly 14 of an embodiment of the present invention (see FIGS. 2-5) typically includes a primary motor assembly at least one motor 20 that engages a gear wheel 22, which itself engages and moves the chain spaced within the track. A primary motor assembly according to an embodiment is shown in FIGS. 2-4 while a secondary motor assembly that may be used in conjunction with the primary motor assembly is shown in FIG. 5. When a second motor assembly is used, the overall system can accommodate a significantly longer track. Typically, when two or more motor systems are utilized, the track can be up to an additional approximate 150 meters long or allows for additional weight to be added to the system (typically more or bigger hanging baskets).

The motor 20 engages the motor mounting platform 35 by engaging the motor mounting bracket 37. The motor mounting bracket 37 is typically substantially diamond-shaped with an aperture 39. The motor mounting bracket 37 typically has rounded edges. The aperture 39 is typically circular. The motor mounting bracket 37 typically has a plurality of spaced-apart fastener receiving apertures that typically receive nut and bolt fasteners to engage the motor 20 and the first bearing assembly 41. The first bearing assembly 41 typically engages the motor mounting platform with nut and bolt fasteners. The drive shaft collar 45 of the motor engages the gear wheel 22 typically via nut and bolt fasteners. The drive shaft 43 also typically engages the drive shaft collar 45 via a fastener, typically a nut and bolt fastener system. The gear wheel 22 is typically shielded on the bottom by a generally U-shaped guard bracket 24 with guard bracket flanges 26 that engage to support rods 28. A second bearing assembly 47 engages the guard bracket 24 (typically using nut and bolt fasteners) and matingly engages the collar 45. The second bearing assembly and the first bearing assembly may be mounted to the exterior (as shown in FIG. 3) or interior facing surfaces of the guard bracket 24 and the motor mounting platform. The primary motor assembly 19 and secondary motor assembly (see FIGS. 5A-5B) as well as typically any other such assemblies typically contain a chain guide/tensioning assembly 65 that contains two bearing assemblies 67 above and below a spacer 69 that contains a channel 71 for receiving the chain and providing guidance and/or tension to the chain as it proceeds with engagement with the gear wheel 22 thereby keeping the chain in operable connection with the gear wheel 22.

The support rods 28 are engaged to a ceiling truss support 30 typically via U-shaped bolts and the steel profile engagement bracket 34. The support rods are reinforced by support rod receiving tubes 49 that are engaged to the motor mounting bracket, the stationary platform, and the tensioning platform via nuts and bolts or a weld. The support rod receiving tubes are typically substantially square such that the circular tubes matingly engage with the support rod receiving tubes and thereby structurally support the tubes and prevent torsional forces from damaging the support rods when the system is operational. One or more treaded frictional force applying tightening screw(s)/bolt(s) 51 may be used to apply force to the support rods from outside the support rod receiving tubes thereby helping retain them in position. The force from the tightening screw(s)/bolt(s) 51 can be removed to facilitate any necessary change to the width of the overall system along support rods 28.

A stationary platform 36 facilitates maintaining the motor unit square. The stationary platform is typically affixed to the track assembly 12. The motivating assembly also typically includes two generally mirrored left and right tensioning subassemblies 38. Each contains a tensioner 40 affixed to a fixed point 43 as well as the tensioner platform 44. The tensioning platforms are typically engaged to one or, if a wider stance is desired, more than one of the support rods 28. Typically the engagement is via a nut and bolt arrangement. The tensioner 38 is typically a hydraulic cylinder, which keeps tension on the chain during use. The amount of tension is set based upon the length of the chain. Fine adjustment of the amount of tension may be made through the use of the threaded secondary rod 46. Should the chain break, the tensioning subassemblies would move away from the fixed motor subassembly portion and limit switch 48 would shut down the system. Additionally, the location of the fixed point 42 may be adjusted along apertures 50 in the motor subassembly of the motivating assembly (see FIG. 4). Nut and bolt arrangements 52 are typically utilized to retain the curved track elements in position. (See FIG. 12).

Figure 5A:
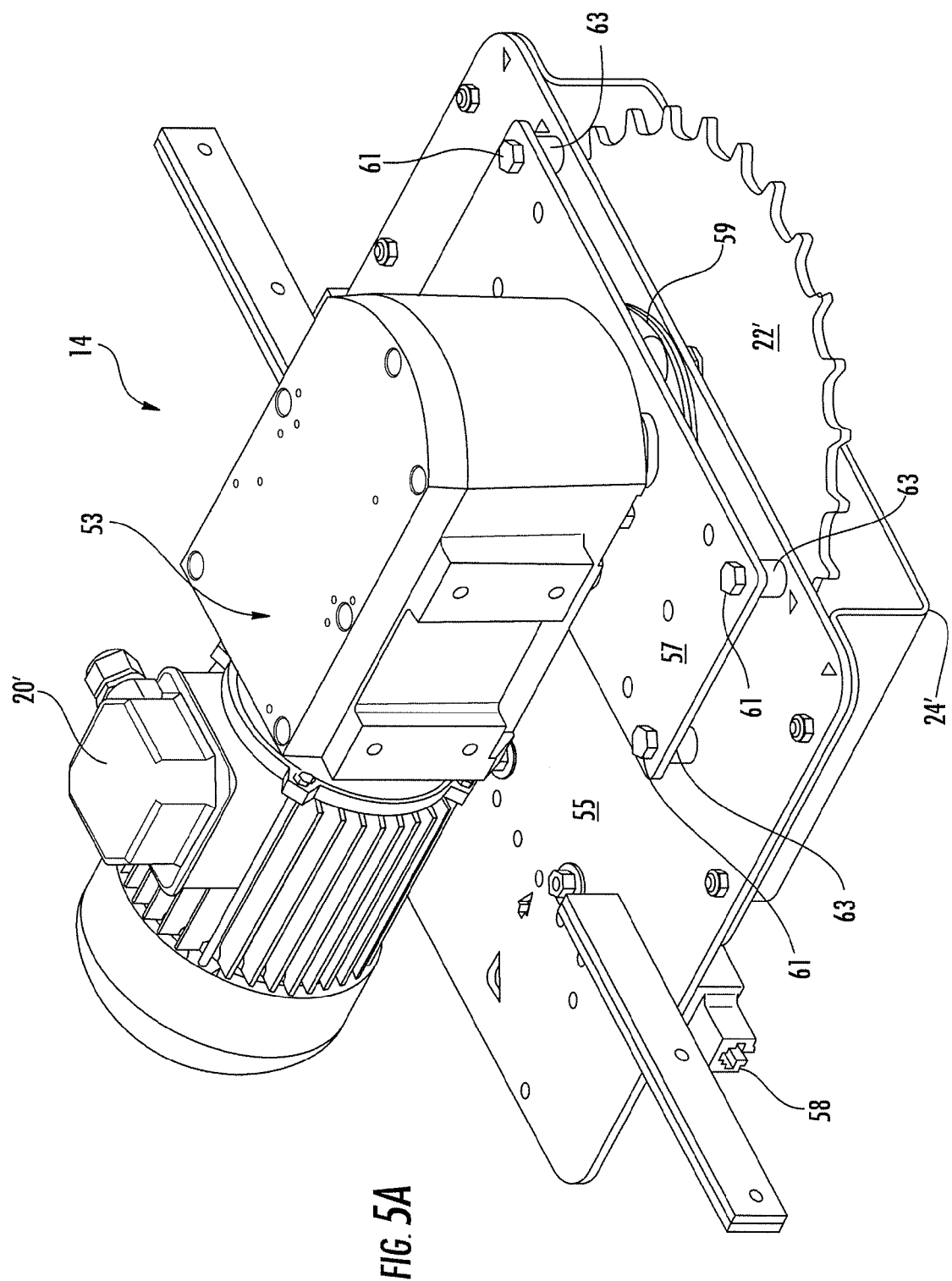
FIG. 5A is a perspective view of a secondary motor assembly according to an embodiment of the present invention.
Figure 5B:
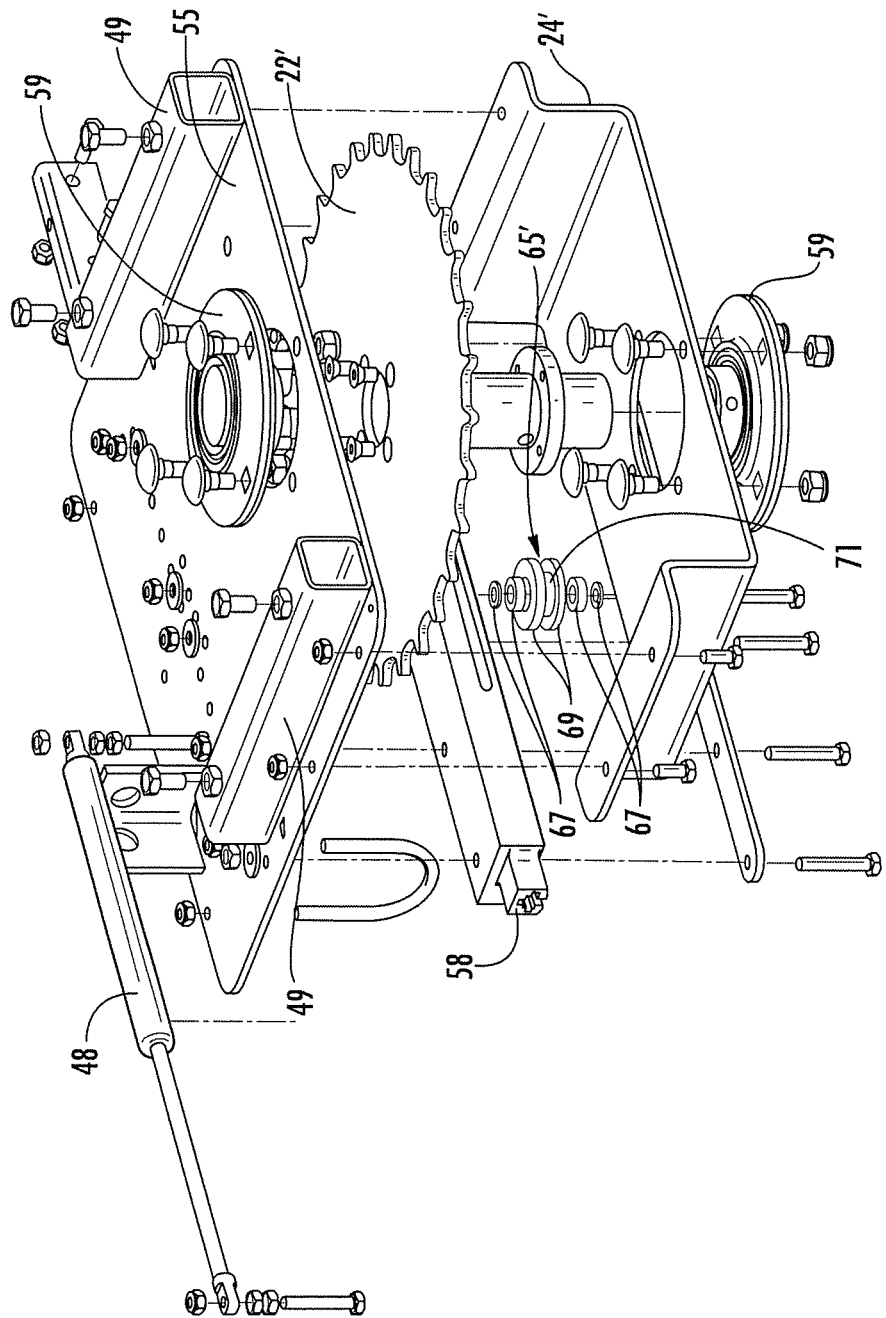
FIG. 5B is an exploded perspective view of a secondary motor assembly according to an embodiment of the present invention.

The motor assembly of the present invention may also further contain a second motor assembly, an embodiment of which is generally shown in FIG. 5. This second motor assembly is primarily for adding additional driving force to the chain in the track and is especially useful when numerous non-traditional directional changes are made in the track or where the track has an especially long track length. The motor is typically positioned at a station some distance along the track away from the primary motor assembly, such as approximately the midway point of the track. The second motor assembly engages the truss assembly, which is typically near the top of a greenhouse or other facility and, like the primary motor assembly, contains a motor 20' and a gear wheel 22'. The track is typically mounted to the motor support plate 55, which itself engages the typically smaller sized, motor engaging plate 57. The motor engaging plate engages and mounts the motor 20'. A bearing assembly 59 is positioned between the motor engaging plate and the motor support plate (see FIG. 5A). The motor engaging plate and the motor support plate are engaged with one another, typically by a nut and bolt type fastener system using a spacer for added structural support between the plates. A substantially U-shaped guard bracket 24' is engaged to the opposing side of the motor support plate for shielding the gear wheel 22'. Typically, they are engaged with one another using nut and bolt fasteners. While not shown, as was the case for the primary motor assembly, the secondary (and subsequent) motor assemblies typically contain a chain guide/tensioning assembly that contains two bearing assemblies 67 above and below a spacer 69 that contains a channel 71 for receiving the chain and providing guidance and/or tension to the chain as it proceeds with engagement with the gear wheel 22' thereby more reliably keeping the chain in operable connection with the gear wheel 22'.

The track assembly 12 typically includes a roll formed metal outer portion 54 as shown in FIG. 5. This outer portion of the track 54 typically has a narrower upper portion 56 and a lower portion 60 of the outer portion of the track. A chain-carrying portion 58 is received in the lower portion 60. The chain-carrying portion 58 is typically an extruded colored plastic, most typically a green extruded plastic. The height of upper portion 56 is typically from about 44.5 mm to about 45.5 mm. The height of section 60 is typically from about 24.5 mm to about 25.5 mm and the width is typically from about 29.5 mm to about 30.5 mm. The chain-carrying portion 58 typically has a horizontal 106 and a vertical chain engaging sections 108 that allow for an interconnected chain to be positioned within the chain-carrying portion 58. The chain is positioned within the chain carrying portions with the opening of the chain-carrying portion facing downward to allow the hook to travel.

As shown in FIGS. 1 and 8-11, the track assembly 12 typically has at least one moveable section 7 that is capable of moving between a first position and a second position where the first position is at least substantially aligned and more typically completely aligned with the remaining portion of the track assembly proximate the moveable section and the second position allows for a user of the entire system 10 to install baskets on the hooks 70 while the user is standing safely on a level surface, typically the ground or floor of the building structure (greenhouse). The moveable section 7 is typically moved between the first and second position using a crank and pulley system operably connected to the moveable section in such a manner that a user can crank the pulley system and moves the moveable section 7 between various positions including the first and second positions. Optionally, this may be done by a motor assembly instead of a manual system the cord or chain connected to the moveable section lengthens allowing gravity to pull it downward into a bent position.

In order to allow for the movement of the moveable section 7, the track assembly has a bending portion as shown in FIGS. 8-11. Bending track portion 110 is typically constructed using a plurality of interconnected elongated brackets 92. The elongated bracket 92 typically utilizes two oval engagement points 94. These engagement points are apertures for receiving threaded nuts and bolts. As shown in FIGS. 8-10B, the elongated brackets are positioned on alternate sides of one another with square spacer brackets engaged to the center aperture 98 of the elongated bracket, which is typically circular. As shown primarily in FIG. 8, smaller sections of outer portions 54A of the track having the same or approximately the same width as the square spacer brackets 96 are positioned and engaged via a nut and bolt assembly as shown. Additionally, it is noted that the oval engagement point within the generally circular shaped end section 100 engages the oval engagement point within the body of a second elongated bracket on an opposing side. This pattern is repeated until a sufficient or desired length of bend in the track is achieved. The longer the configuration and the greater the bend in the track. As shown in FIG. 8 at each end of the bending portion a rectangular bracket 102 is affixed to the upper portion 56 of the adjoining track length.

As shown in FIGS. 12-13, similar rectangular brackets 102 are used to engage the track 56 to the turning track sections 112. The turning track section 112 shown in FIGS. 12-13 and FIGS. 17A-18B is a 90-degree turning section that is most typically used. The chain-carrying portion is typically a one-piece extruded section to avoid binding of the chain in the track and facilitate smooth movement of the chain. The upper, typically metal, bracket section 114 usually engages the curved chain carrying section, which is typically a 90-degree bend, using a nut and bolt system as shown in FIGS. 12-13.

Figure 14:
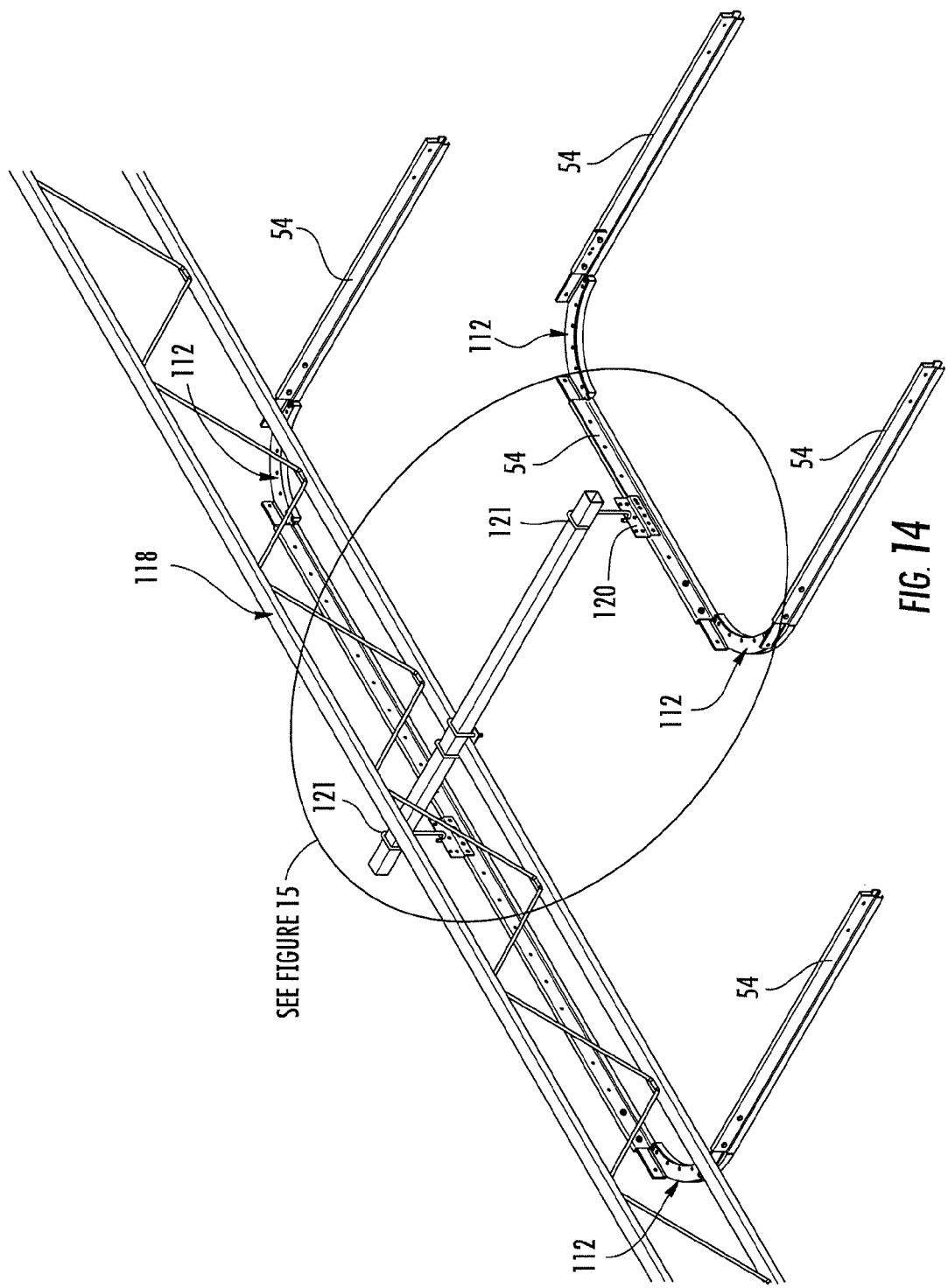
FIG. 14 shows a perspective view of a portion of the track layout shown in FIG. 1.
Figure 15:
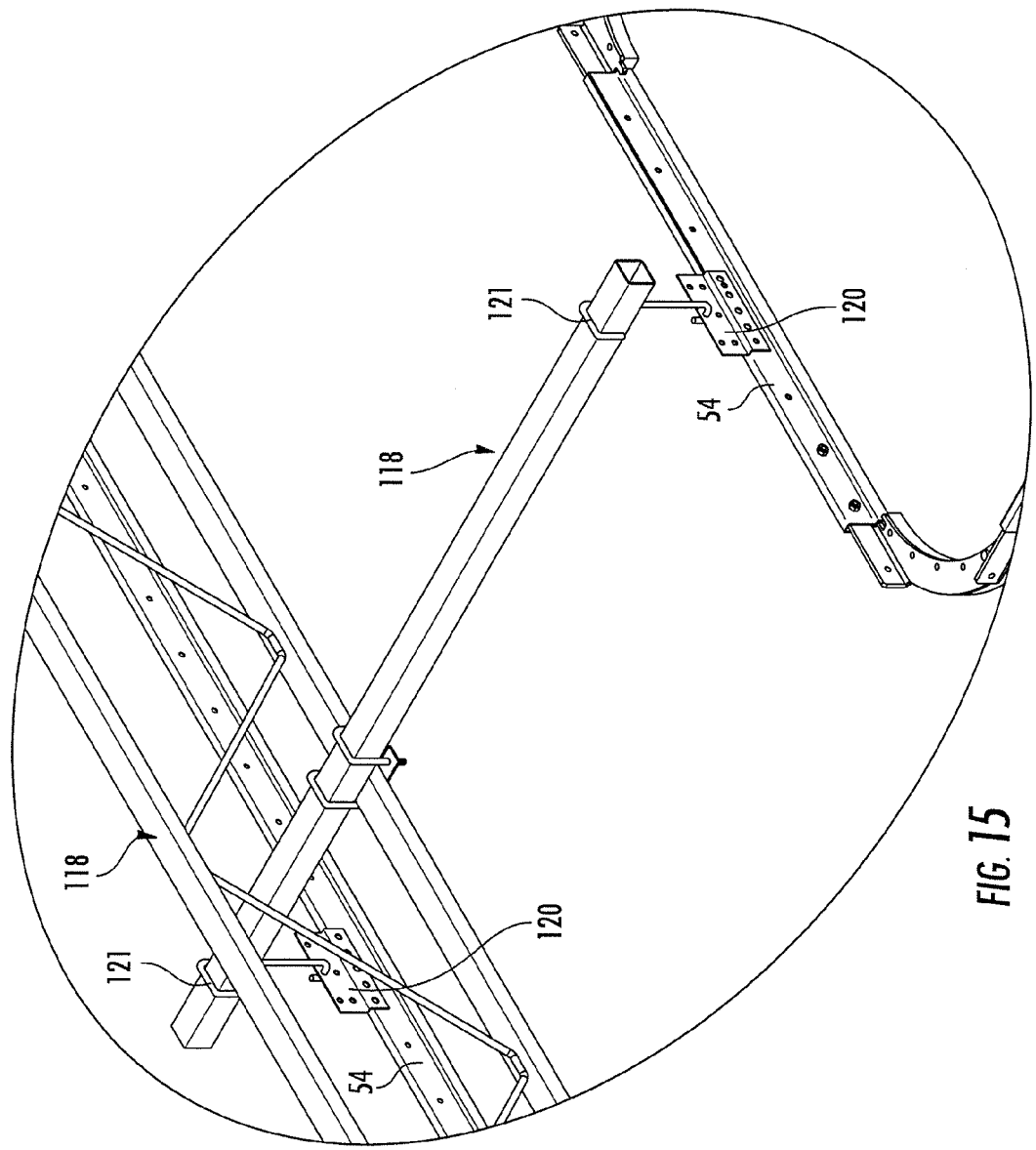
FIG. 15 is an enlarged view of the portion of the track layout shown in FIG. 14 from a different view point.
Figure 16:
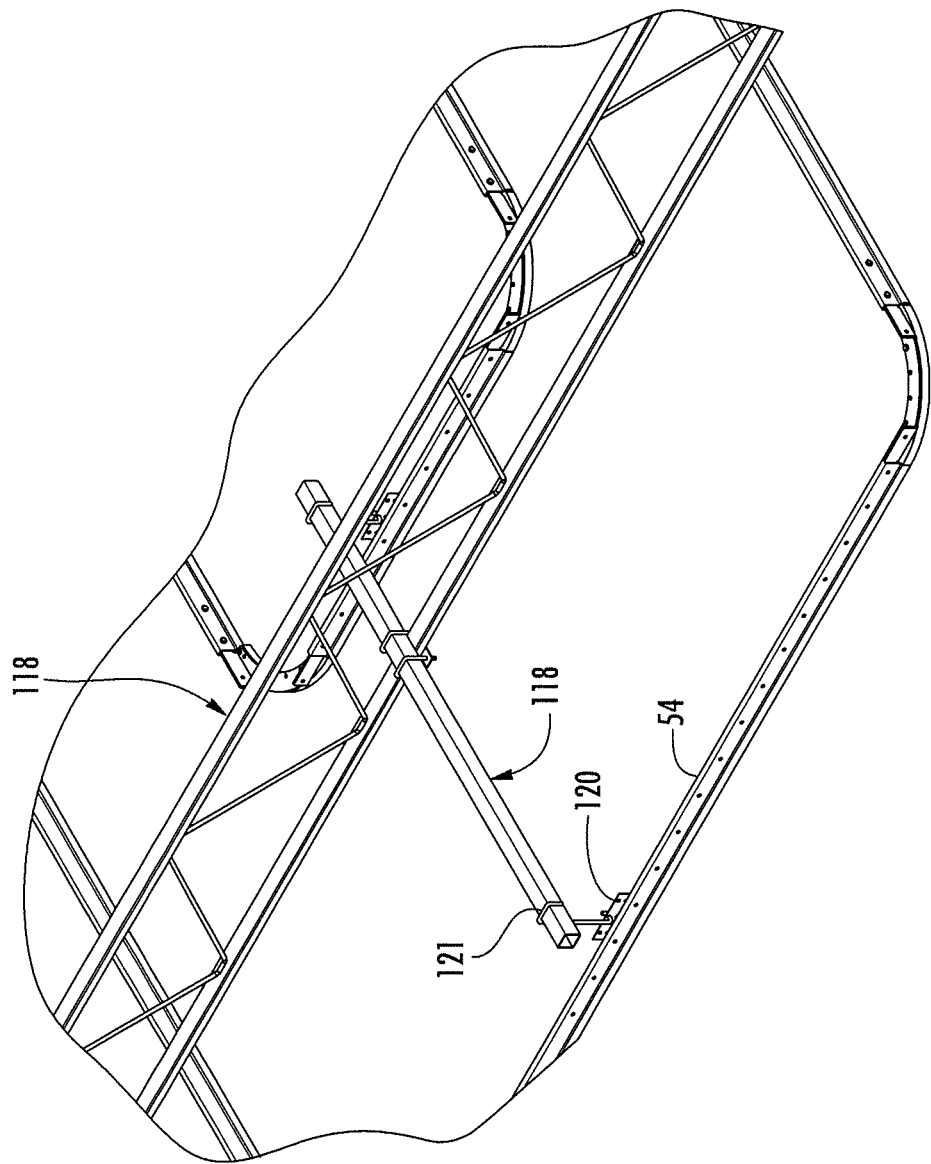
FIG. 16 is a rear perspective view of a portion of the rack layout shown in FIG. 14.
Figure 18A:
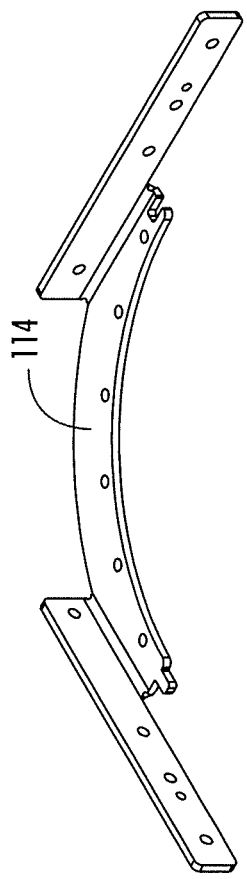
FIGS. 18A-18B are a perspective view and a top view of the curved bracket support, which engages the curved chain carrying portion of the track, respectfully.
Figure 18B:
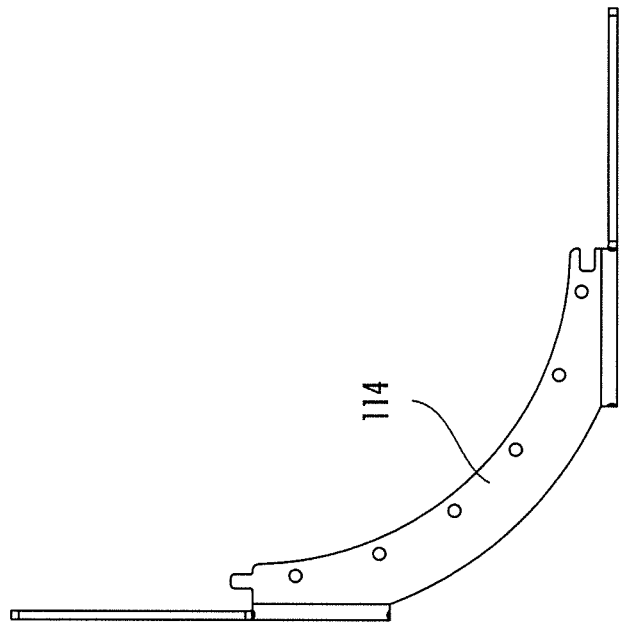
Figure 17A:
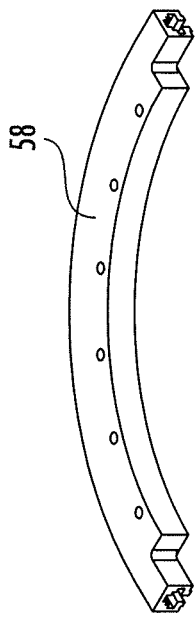
FIG. 17A is a top view of a curved chain carrying portion of the chain-carrying portion according to an embodiment of the present invention.
Figure 17B:
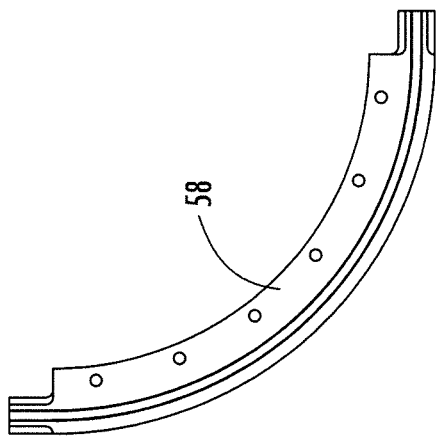
FIG. 17B is a bottom view of a curved chain carrying portion of the chain-carrying portion according to an embodiment of the present invention.
Figure 19:
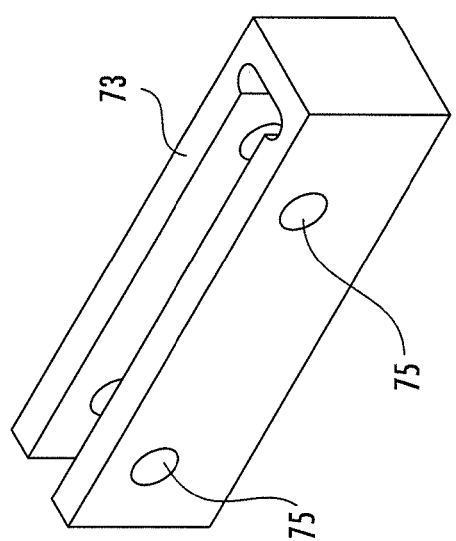
FIG. 19 shows a drill aligning tool utilized to properly space the holes in the track assembly.
Figure 21:
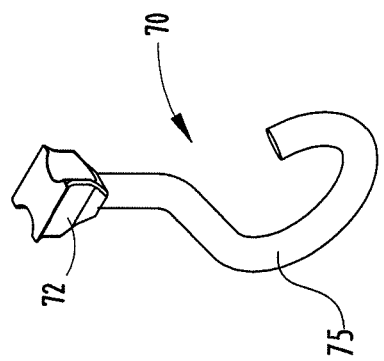
FIG. 21 is a perspective view of a removable hook utilized to engage the chain riding within the track and the hanging horticulture/floriculture product therefrom.
Figure 20:
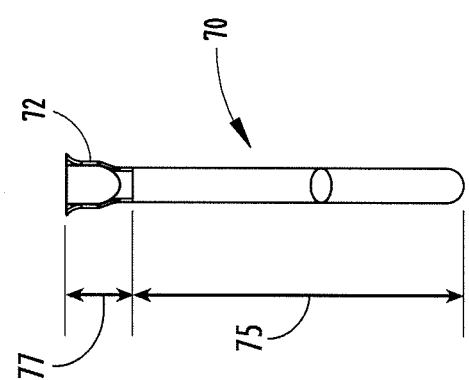
FIG. 20 is an end view of a removable hook according to an embodiment of the present invention.

An embodiment of the present invention shown in FIGS. 14-16 is shown engaged to the truss system 118 in a structure such as a greenhouse. As shown in FIGS. 14-16, the track assembly 12 engages the truss system 118. A truss assembly mounting bracket 120 can be engaged to the track 12 typically the upper portion of the outer portion of the track 54 and the track system engaged to the truss assembly as shown using a metal hook-like suspension rod 121 that fits within an aperture in the truss assembly mounting bracket and the other end is engaged to the truss system 118. It is also contemplated that the track of the present invention will be welded or engaged directly to the structural support at the top of greenhouse such as a truss system.

The present invention also typically utilizes a drill aligning tool 73 to properly located holes in the track assembly when the track assembly segments are interconnected with one another. The drill alignment tool is placed over the top portion of the outer portion of the track 54. Thereafter, a drill may be used with the drill bit passing through apertures 75 and drilling apertures in the upper portion of the track at properly spaced intervals for interconnecting track segments or for engaging the track with, for example, an elongated bracket 92 (see, for example, aperture configuration in FIGS. 10A-B at beginning and end of bending portion of the track).

The chain 21 may be inserted into the chain-carrying portion using a chain-pulling device (see FIGS. 29A-C) to pull the chain through the apparatus. The aperture within the chain is placed over pin 64, which may be the end of a threaded bolt or similar device. Round, rubber, typically rotatable, stabilizing wheels 66 help ensure easy installment of the chain within the track.

Either before or after the chain is installed in the track, but typically after the chain is installed in the track, a hook 70 may be installed in the holes in the horizontal chain segments and ride therein around the track assembly when the chain is moved. The hook 70 typically has a configuration such as that described in FIGS. 20-21 or FIGS. 22-24. The hook 70 has a main hook/hanging basket-receiving section 75 and a head section 77. The head section has a cap 79. The cap 79 is typically about 2 mm thick (the difference between the distance A and distance B in FIG. 23). The width of the cap designated as the distance G on FIG. 23 is typically about 9 mm. The distance B from the top of the main hook/hanging basket-receiving section is typically about 8.5 mm and the distance A and the distance C are typically about 10.5 mm and about 4 mm respectfully. The width F of the main hook/hanging basket-receiving section is typically about 5 mm and the width of the base of the cap designated by distance E is about 6.5 mm. The distance H of the cap is typically about 8.2 mm. The distance D (FIG. 24) is typically about 5 mm. All of the dimensions about the hook 70 may vary by about 0.5 mm plus or minus such that the distance D, for example may vary from about 4.5 mm to about 5.5 mm.

Figure 26:
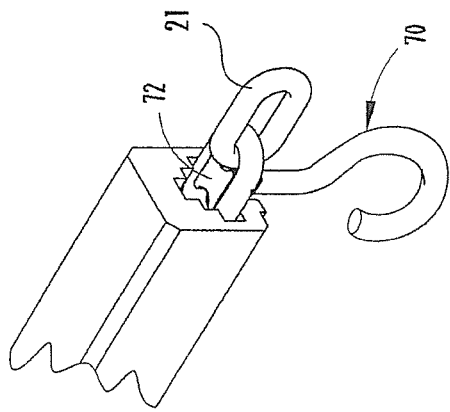
FIGS. 25-26 show the installation of the removable hook according to an embodiment of the present invention.
Figure 25:
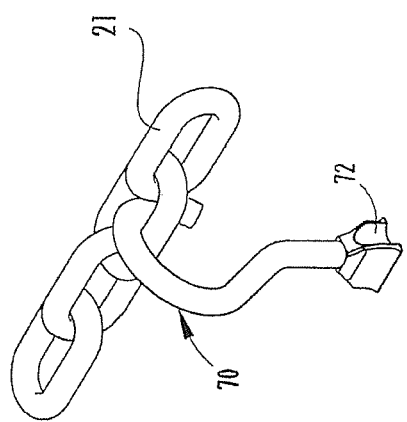

To install a hook 70, typically tension is released from the tensioning subassemblies and hooks appropriately spaced are inserted in the chain through a gap 68 between the motor subassembly and the tensioning subassembly. The end of the hook 70 is preferably shaped to tightly engage the chain while not protruding substantially above the top surface of the chain link. Typically the chain engagement end 72 of the hook 70 is integral with the remaining portion of the hook 70. (See FIGS. 20-24). As shown in FIGS. 25-26, the hook 70 is inserted with the end distal from the cap into the aperture in the horizontal, unitary chain link of the chain and pulled through such that the cap is seated within the horizontal, unitary chain link of the chain.

Figure 28:
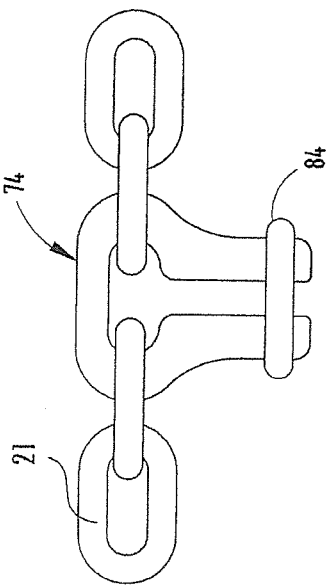
FIG. 28 is a side elevation view of the chain linking member engaging the ends of two chains.
Figure 27:
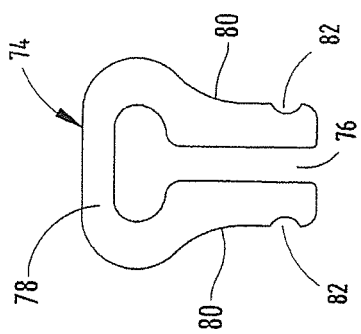
FIG. 27 is an elevated side view of a chain linking member according to an embodiment of the present invention.

As shown in FIGS. 27 and 28, individual unitary chain links may be adjoined using a chain-linking member 74, which has a chain link-receiving channel and a chain retaining upper portion 78, which is generally oblong shaped. Additionally, the downwardly extending legs 80 of the chain-linking member 74 typically have curved portions 82 for receiving a single chain link or similar engagement device 84, which facilitates retention of the chain-linking member in position.

As discussed generally above, one or more ends of track loops 18 may be optionally constructed to move from a position level with the rest of the track to a declined angle to facilitate engagement of the baskets or other horticulture/floriculture product on the hooks. Angle 86 (see FIGS. 1A-1C) between the level track and the declined track depends on the distance between the baskets and the distance between the hinge point 88 and the end point of the loop 90. The angle 86 may be up to 45° but more typically is up to 30° and most typically is up to about 20°. Typically the end of the loop 90 is engaged to a crank system that, when the user operates the crank allows the end of the loop portion of the track to decline or raises the end loop of the track. The configuration typically utilized is similar to a boat winch.

Figure 30:
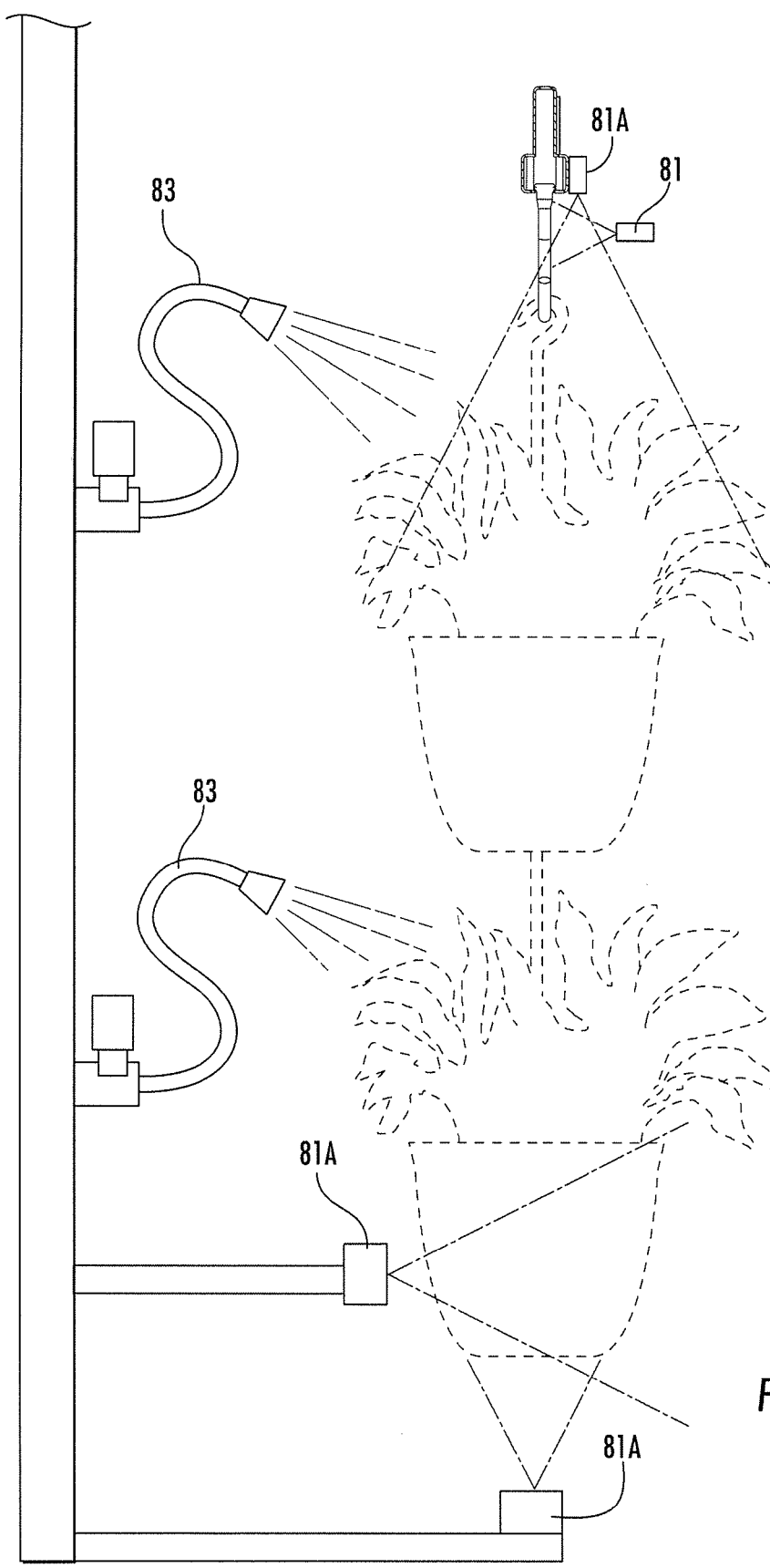
FIG. 30 is a side elevated view of the watering and basket detection system according to an embodiment of the present invention.

Additionally, the present system may use an automated watering system (See FIG. 30). Applicants have discovered that if a watering system 83 positioned within approximately six (6) inches of the top surface of the plastic, soil retaining portion of a hanging basket is utilized, the watering system can effectively water hanging baskets traveling along the track from a single location. This allows the baskets to be watered even though they are moved to different locations within the greenhouse or building structure along the track. Additionally, water may be added based upon a sensing system that evaluates the weight of a basket at a certain location on the track. When the basket is too light, water is added until a certain weight measurement is achieved by the sensor system. The sensor system may be coupled to a computer system to further automate the watering process. Additionally, instead of or in addition to, a vision sensor system may be utilized to determine when a basket is in position for watering and watered at predetermined or user determined time intervals.

In one embodiment of the vision sensor system shown in FIG. 30, optical sensors 81 and 81A work in conjunction with one another to determine if a hanging basket is present and thereby allow for predetermined time interval watering of the hanging baskets. The sensors 81A determine if a hanging basket is present at predetermined heights. Obviously, fewer or more sensors can be used if more or less levels of hanging baskets are used. Typically, two levels of hanging baskets are present and therefore two sensors are employed. Sensor 81 visual determines if a hook is present as well such that watering is not done when a hook is not present and therefore a basket is not present. When the basket is too light, water is added until a certain weight measurement is achieved by the sensor system. The sensor system may be coupled to a computer system to further automate the watering process. Additionally, instead of or in addition to, a vision sensor may be utilized to determine when a basket is in position for watering and watered at predetermined or user determined time intervals. The vision sensor system may be coupled to a computer system to further automate the watering process and automate the watering times based upon user input.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A horticulture and floriculture device for use in a greenhouse or similar structure comprising:
   a track system that receives and carries a moveable chain system wherein the track system comprises a plurality of track segments that have a chain carrying portion and an upper portion and wherein the track segments are interconnected with one another to create a travel path wherein the moveable chain system comprises a series of interconnected chain links having an aperture wherein the chain links include horizontally oriented and vertically oriented unitary chain links; and
   a plurality of hanging basket receiving hooks wherein the hanging basket receiving hooks have a main hook portion with a distal end opposite a cap portion having a base wherein the cap portion includes an outwardly extending lip that extends from a perimeter of the cap portion and is configured to engage a top surface of the chain link and be seated within the chain links apertures and held in place by gravity, and a main hook portion between the distal end and the base of the cap portion wherein the cap portion engages, is at least partially spaced within, and is seated in the chain link's aperture such that the chain is capable of moving within the track and carrying the hook around the track with the main hook portion accessible by a user to hang a hanging basket on the hook.

2. The horticulture and floriculture device of claim 1 further comprising a first motor assembly comprising a motor, a gear wheel having a plurality of projections that matingly engage the vertically oriented unitary chain links and drive movement of the chain system within the track and wherein the track system is suspended from a ceiling or wall of a greenhouse and wherein the horticulture and floriculture device further comprises a plurality of hanging baskets wherein one hanging basket engages one of the hanging basket receiving hooks and wherein the hook cap portion engages a top surface of the horizontally oriented unitary chain link.

3. The horticulture and floriculture device of claim 2, wherein the track system is positioned proximate a ceiling in a greenhouse and includes a main track section and a declinable track portion wherein the declinable track portion comprises a series of interconnected elongated brackets positioned on alternate sides of one another with a spacer bracket engaged to the center of the elongated brackets that are not engaged to the main track sections and wherein the declinable track portion is capable of repeatedly moving between a first position that is in substantially the same plane or the same plane as the main track section and a declined position wherein the declined position is at least about a 20 degree angle from the plane of the main track section.

4. The horticulture and floriculture device of claim 3, wherein the main hook portion extends below the horizontally oriented chain links and the main hook portion receives a hanging basket on the hook without the user touching the hanging basket receiving hook once the hanging basket receiving hook is installed and seated within one of the horizontally oriented chain links.

5. The horticulture and floriculture device of claim 4, wherein the elongated brackets comprise a center section with two ends that integrally connect with two substantially circular end sections to form the elongated bracket and wherein one of the substantially circular end sections comprises an oval aperture and the other a circular aperture and the center section further comprises an oval aperture proximate the end of the center section distal from the circular end section with the oval aperture and a circular aperture located at about the middle of the center section and a circular aperture at the end distal from the circular aperture containing substantially circular section and proximate the oval aperture containing substantially circular section.

6. The horticulture and floriculture device of claim 2, wherein the first motor assembly further comprises a chain guide assembly that guides the chain into engagement with the projections on the gear wheel and provides tension on the chain.

7. The horticulture and floriculture device of claim 2, wherein the first motor assembly is mounted at a first location and further comprising a second motor assembly positioned at a second location at least 40% of the overall track distance away from the first location and wherein the second motor assembly comprises a motor, a gear wheel having a plurality of projections that matingly engage the vertically oriented chain links and drive movement of the chain system within the track.

8. The horticulture and floriculture device of claim 7, wherein the track assembly is from about 300 to about 450 meters long.

9. The horticulture and floriculture device of claim 7, wherein the track assembly is at least 300 meters long.

10. The horticulture and floriculture device of claim 2 further comprising a stationary platform affixed to the track assembly and functioning to keep the first motor assembly square.

11. The horticulture and floriculture device of claim 1, wherein the track system is positioned proximate a structural ceiling and further comprises a main track section and a declinable track portion wherein the declinable track portion comprises a series of interconnected elongated brackets positioned on alternate sided of one another with a spacer bracket engaged to the center of the elongated brackets that are not engaged to the main track sections and wherein the declinable track portion is configured to be repeatedly moved between a first position that is in substantially the same plane or the same plane as the main track section and a declined position that allows for ground level installation and removal of hanging baskets by a person standing on the floor without a ladder or other extending device, wherein the declined position is at least about a 20 degree angle from the plane of the main track section.

12. The horticulture and floriculture device of claim 11, wherein the main hook portion and the cap portion are integrally engaged to one another and the cap portion is wider and thicker than the thickness of the main hook portion at the distal end of the main hook portion.

13. The horticulture and floriculture device of claim 12 further comprising a first motor assembly comprising a motor, a gear wheel having a plurality of projections that matingly engage the vertically oriented unitary chain links and drive movement of the chain system within the track.

14. The horticulture and floriculture device of claim 13, wherein the first motor assembly is mounted at a first location and further comprising a second motor assembly positioned at a second location at least 40% of the overall track distance away from the first location and wherein the second motor assembly comprises a motor, a gear wheel having a plurality of projections that matingly engage the vertically oriented chain links and drive movement of the chain system within the track and wherein the first motor assembly and the second motor assembly each further comprise a chain guide assembly that guides the chain into engagement with the projections on the gear wheel and optionally provides tension on the chain.

15. The horticulture and floriculture device of claim 11 further comprising a declinable track portion moving system operably connected to the declinable track portion wherein the moving system operates to move the declinable section of the track between the first position and the declined position and wherein the top of the cap portion of the hooks is below the height of the vertically oriented unitary chain links when the hooks are seated within the horizontally oriented chain lengths and wherein the track assembly is about 300 to about 450 meters long and the track assembly further includes a watering system that comprises a plurality of optical sensors that sense if a hanging basket is present at a sensing location and the watering system further senses the weight of the hanging basket at a weighing location along the track and when the basket is below a certain weight, water is added to the basket until the basket reaches or exceeds the certain weight.

16. The horticulture and floriculture device of claim 1, wherein the track system comprises a plurality of directional changes and further comprises a main track section and a declinable track portion wherein the declinable track portion comprises a series of interconnected elongated brackets positioned on alternate sides of one another with a spacer bracket engaged to the center of the elongated brackets that are not engaged to the main track sections using fasteners extending horizontally through the elongated bracket.

17. A horticulture and floriculture device for use in a greenhouse or similar structure comprising:
a track system that receives and carries a moveable chain system wherein the track system comprises a plurality of track segments that have a chain carrying portion and an upper portion and wherein the track segments are interconnected with one another to create a travel path wherein the moveable chain system comprises a series of interconnected chain links having an aperture wherein the chain links include horizontally oriented and vertically oriented unitary chain links;
a plurality of hanging basket receiving hooks wherein the hanging basket receiving hooks have a distal end opposite a cap portion having a base and a main hook portion between the distal end and the base of the cap portion wherein the cap portion engages, is at least partially spaced within, and is seated in the chain link's aperture such that the chain is capable of moving within the track and carrying the hook around the track with the main hook portion accessible by a user to hang a hanging basket on the hook;
a first motor assembly comprising a motor, a gear wheel having a plurality of projections that matingly engage the vertically oriented unitary chain links and drive movement of the chain system within the track and wherein the track system is suspended from a ceiling or wall of a greenhouse and wherein the horticulture and floriculture device further comprises a plurality of hanging baskets wherein one hanging basket engages one of the hanging basket receiving hooks and wherein the hook cap portion engages a top surface of the horizontally oriented unitary chain link; and
a stationary platform affixed to the track assembly and functioning to keep the first motor assembly square; and
wherein the first motor assembly further comprises two generally mirrored left and right tensioning subassemblies wherein each tensioning subassembly comprises a tensioner with two engagement locations wherein one engagement location is affixed to a fixed point on a motor mounting platform and the other engagement location is affixed a tensioning platform.

18. The horticulture and floriculture device of claim 17, wherein the tensioners are hydraulic cylinders and wherein the subassemblies further comprise a limit switch that receives input on the tension force on the chain and instructs the motor to shut down if the chain breaks while the motor is running.

19. A horticulture and floriculture device for use in a greenhouse or similar structure comprising:
- a track system that receives and carries a moveable chain system wherein the track system comprises a plurality of track segments that have a chain carrying portion and an upper portion and wherein the track segments are interconnected with one another to create a travel path wherein the moveable chain system comprises a series of interconnected chain links having an aperture wherein the chain links include horizontally oriented and vertically oriented unitary chain links; and
- a plurality of hanging basket receiving hooks wherein the hanging basket receiving hooks have a distal end opposite a cap portion having a base and a main hook portion between the distal end and the base of the cap portion wherein the cap portion engages, is at least partially spaced within, and is seated in the chain link's aperture such that the chain is capable of moving within the track and carrying the hook around the track with the main hook portion accessible by a user to hang a hanging basket on the hook;
- wherein the track system comprises a plurality of directional changes and further comprises a main track section and a declinable track portion wherein the declinable track portion comprises a series of interconnected elongated brackets positioned on alternate sides of one another with a spacer bracket engaged to the center of the elongated brackets that are not engaged to the main track sections using fasteners extending horizontally through the elongated bracket; and
- wherein the spacer brackets are substantially square or square, are substantially the same or the same thickness as the elongated brackets, and are spaced between elongated brackets on the same side of the declinable track portion, and wherein the spacer brackets are held in place by a track segment with the outer portion of the track segment capable of retaining track in a chain carrying portion and having an upper portion of the outer portion of the track segment that has a substantially square or square shaped side view and is engaged to a center aperture in the spacer bracket using a fastener that passes through the spacer bracket and the track segment.

20. The horticulture and floriculture device of claim 19, wherein the declinable track portion is operably connected to a device that holds the declinable track portion in a first position that is in substantially the same plane or the same plane as the main track section and the declinable track portion is capable of moving between the first position and a second, declined position that is at least about a 20 degree angle from the plane of the main track section.

* * * * *

UNITED STATES PATENT AND TRADEMARK OFFICE
CERTIFICATE OF CORRECTION

PATENT NO. : 8,453,380 B1  
APPLICATION NO. : 12/502031  
DATED : June 4, 2013  
INVENTOR(S) : Helder et al.

Page 1 of 2

It is certified that error appears in the above-identified patent and that said Letters Patent is hereby corrected as shown below:

In the Specifications

Column 2, line 22, "tracks" should be --track--;

Column 2, line 25, "sided" should be --sides--;

Column 2, line 41, "wench" should be --winch--;

Column 3, line 43, "rack" should be --track--;

Column 3, line 45, "chain carrying" should be --chain-carrying--;

Column 3, line 47, "chain carrying" should be --chain-carrying--;

Column 3, line 51, "chain carrying" should be --chain-carrying--;

Column 3, line 55, "chain carrying" should be --chain-carrying--;

Column 3, line 56, "respectfully" should be --respectively--;

Column 4, line 32, "numbers" should be --number--;

Column 6, line 65, "horizontal 106" should be --horizontal chain engaging section 106--;

Column 6, line 66, "sections" should be --section--;

Column 7, line 1, "chain carrying" should be --chain-carrying--;

Column 7, line 21, after "system" insert --,--;

Column 7, line 44, "configuration and the" should be --configuration, the--;

Column 7, line 56, "chain carrying" should be --chain-carrying--;

Column 8, line 2, after "of" insert --the--;

Column 8, line 5, "located" should be --locate--;

Column 8, line 36, "respectfully" should be --respectively--;

Column 9, line 41, "visual" should be --visually--;

Signed and Sealed this  
Twenty-eighth Day of January, 2014

Michelle K. Lee  
*Deputy Director of the United States Patent and Trademark Office*

CERTIFICATE OF CORRECTION (continued)
U.S. Pat. No. 8,453,380 B1

In the Claims

Column 10, claim 1, line 10, "chain links apertures" should be --chain link's apertures--;

Column 11, claim 11, line 27, "sided" should be --sides--;

Column 12, claim 15, line 2, "lengths" should be --links--;

Column 12, claim 17, line 25, "chain carrying" should be --chain-carrying--;

Column 12, claim 17, line 61, "affixed a tensioning" should be --affixed to a tensioning--;

Column 13, claim 19, line 5, "chain carrying" should be --chain-carrying--;

Column 14, claim 19, line 11, "chain carrying" should be --chain-carrying--.